United States Patent
Hasegawa et al.

(10) Patent No.: US 8,563,157 B2
(45) Date of Patent: Oct. 22, 2013

(54) NONAQUEOUS ELECTROLYTE SECONDARY BATTERY AND METHOD FOR MANUFACTURING THE SAME

(75) Inventors: Masaki Hasegawa, Osaka (JP); Takashi Takeuchi, Osaka (JP); Tsunenori Yoshida, Kyoto (JP)

(73) Assignee: Panasonic Corporation, Osaka (JP)

( * ) Notice: Subject to any disclaimer, the term of this patent is extended or adjusted under 35 U.S.C. 154(b) by 505 days.

(21) Appl. No.: 12/808,116

(22) PCT Filed: Dec. 12, 2008

(86) PCT No.: PCT/JP2008/003748
§ 371 (c)(1),
(2), (4) Date: Jun. 14, 2010

(87) PCT Pub. No.: WO2009/078159
PCT Pub. Date: Jun. 25, 2009

(65) Prior Publication Data
US 2010/0273045 A1   Oct. 28, 2010

(30) Foreign Application Priority Data

Dec. 14, 2007  (JP) ................................. 2007-323071
Dec. 14, 2007  (JP) ................................. 2007-323072

(51) Int. Cl.
*H01M 2/14*  (2006.01)
*H01M 2/16*  (2006.01)
*H01M 10/04*  (2006.01)

(52) U.S. Cl.
USPC ........... 429/129; 429/144; 429/246; 29/623.1

(58) Field of Classification Search
USPC ................................. 429/121–347
See application file for complete search history.

(56) References Cited

U.S. PATENT DOCUMENTS

| 6,420,071 B1 | 7/2002 | Lee et al. |
| 2002/0086213 A1 | 7/2002 | Utsugi et al. |
| 2004/0106047 A1* | 6/2004 | Mie et al. ...................... 429/324 |
| 2005/0221170 A1* | 10/2005 | Takeuchi et al. .............. 429/122 |

(Continued)

FOREIGN PATENT DOCUMENTS

| CN | 101006595 A | 7/2007 |
| JP | 61-294756 A | 12/1986 |

(Continued)

OTHER PUBLICATIONS

Chinese Office Action, and partial English translation thereof, issued in Chinese Patent Application No. 200880120491.6 dated Jul. 3, 2012.

(Continued)

*Primary Examiner* — Basia Ridley
*Assistant Examiner* — James Lee
(74) *Attorney, Agent, or Firm* — McDermott Will & Emery LLP

(57) ABSTRACT

A nonaqueous electrolyte secondary battery according to the present invention includes a positive electrode and a negative electrode which are capable of reversibly occluding and releasing lithium; a resin layer provided between the positive electrode and the negative electrode; a battery case accommodating the positive electrode, the negative electrode and the resin layer; a nonaqueous electrolyte solution filling the battery case; and an insulating layer interposed, at least partially, between the positive electrode and the resin layer, the insulating layer containing aluminum fluoride.

11 Claims, 7 Drawing Sheets

(56) References Cited

U.S. PATENT DOCUMENTS

| | | |
|---|---|---|
| 2006/0199294 A1 | 9/2006 | Fujikawa et al. |
| 2006/0222955 A1 | 10/2006 | Ogawa et al. |
| 2007/0122716 A1 | 5/2007 | Seo et al. |
| 2009/0087362 A1 | 4/2009 | Sun et al. |

FOREIGN PATENT DOCUMENTS

| | | |
|---|---|---|
| JP | 05-021069 A | 1/1993 |
| JP | 06-231754 | 8/1994 |
| JP | 08-264183 | 10/1996 |
| JP | 10-255837 | 9/1998 |
| JP | 11-007962 | 1/1999 |
| JP | 11-045740 | 2/1999 |
| JP | 2000-128539 | 5/2000 |
| JP | 2001-035468 | 2/2001 |
| JP | 2006-286531 | 10/2006 |
| JP | 2006-344494 | 12/2006 |
| JP | 2007-103119 | 4/2007 |
| JP | 2007-280917 | 10/2007 |
| KR | 10-2006-0109305 A | 10/2006 |

OTHER PUBLICATIONS

Japanese Office Action, and partial English translation thereof, issued in Japanese Patent Application No. 2009-546141 mailed on Dec. 25, 2012.

Extended European Search Report, issued in European Patent Application No. 08 862 061.2, dated Dec. 6, 2011.

* cited by examiner

NONAQUEOUS ELECTROLYTE SECONDARY BATTERY AND METHOD FOR MANUFACTURING THE SAME

RELATED APPLICATIONS

This application is the U.S. National Phase under 35 U.S.C. §371 of International Application No. PCT/JP2008/003748, filed on Dec. 12, 2008, which in turn claims the benefit of Japanese Application Nos. 2007-323071, filed on Dec. 14, 2007 and 2007-323072, filed on Dec. 14, 2007, the disclosures of which Applications are incorporated by reference herein.

TECHNICAL FIELD

The present invention relates to a nonaqueous electrolyte secondary battery and a method for producing the same, and specifically, to a nonaqueous electrolyte secondary battery chargeable/dischargeable at a high voltage and a method for producing the same.

BACKGROUND ART

A lithium ion secondary battery, which is one type of nonaqueous electrolyte secondary battery, is chargeable at a high energy density and is dischargeable at a high voltage. Therefore, the lithium ion secondary battery is widely used as a main power source of mobile communication devices, mobile electronic devices and the like. Recently, these devices have been desired to be more compact and to provide higher performance. Accordingly, there is a need to develop a lithium ion secondary battery having still higher performance.

Lithium ion secondary batteries practically used today mainly adopt a graphite material as a negative electrode active material. However, these lithium ion secondary batteries already have a capacity close to the theoretical capacity of the graphite material (about 370 mA/g), and so it is difficult to further raise the energy density significantly. Therefore, use of various novel materials as negative electrode active materials which can further raise the capacity of the lithium ion secondary battery has been studied. For example, metal materials capable of occluding and releasing lithium, such as silicon, tin and the like, alloys containing such metal materials and the like have been proposed as negative electrode active materials and are expected to significantly raise the battery capacity.

As positive electrode active materials, lithium transition metal composite oxides having a layered structure or a spinel structure such as lithium cobalt oxide, lithium nickel oxide, lithium manganese oxide and the like are in wide use today. It is also being studied to develop a positive electrode active material capable of realizing a higher energy density than these materials. However, no material has been found so far which is superior to these materials used today in terms of comprehensive characteristics including reversibility and stability of reaction caused by charge/discharge, electron conductivity and the like.

By contrast, layered lithium transition metal oxides such as lithium cobalt oxide, lithium nickel oxide and the like which are used today may possibly be usable to realize a lithium ion secondary battery having a still larger capacity by improving the utilization factor of lithium, which forms the crystals of these oxides. One exemplary method for improving the utilization factor of lithium is to charge the lithium ion secondary battery to a still higher voltage so as to release a larger amount of lithium from the positive electrode active material during the charging of the battery. With this method, the battery is charged by raising the potential of the positive electrode to a still higher level. As a result, the average voltage during the discharging of the battery is raised, which is expected to provide an effect that the energy density of the battery is increased in terms of both of the capacity and the voltage.

However, this method of improving the utilization factor of lithium results in a larger amount of lithium being detached from the crystalline structure. This involves the possibility that the crystalline structure becomes unstable and the positive electrode active material itself is decomposed. As a measure for avoiding this, it has been proposed to stabilize the positive electrode active material by, for example, adding a different type of chemical element or by using a plurality of transition metal materials as main chemical elements to control the crystalline structure and the number of valence of the chemical elements.

With this method, the lithium ion secondary battery needs to operate in a high potential region exceeding 4 V. This requires the active material and also the electrolyte solution to have a high level of oxidation resistance. Lithium ion secondary batteries widely used in the market today generally adopt an electrolyte solution obtained by dissolving a lithium salt in an organic solvent mainly containing a chained or cyclic carbonate-based solvent. In a high potential region, such an electrolyte solution is oxidized and deteriorated by a reaction with materials of the positive electrode which is in a charged state, for example, a positive electrode active material. For example, a carbonate-based solvent is known to cause a reaction such as transesterification or the like and thus to be deteriorated. Such deterioration lowers the reliability of the lithium ion secondary batteries.

As means for suppressing the above-described deterioration of the electrolyte solution, it has been proposed to cover a surface of particles of the active material with a material having a high level of oxidation resistance. For example, Patent Document No. 1 discloses improving the cycle characteristic by covering a surface of the active material particles with a metal fluoride to decrease the activity of the surface of the active material and thus to suppress the reaction of the active material with the electrolyte solution.

Patent Document No. 2 discloses covering a surface of the active material particles with a metal halide to allow halogen to exist also inside the particles in an inclining manner from the surface to the inside. According to Patent Document No. 2, this controls the cycle characteristic at a high temperature and suppresses a reaction of the battery in a stored state, and thus the battery can be charged at a high voltage of up to 4.5 V.

Patent Document No. 3 discloses improving reversibility of lithium ions under a high temperature and a high voltage by allowing the material of the positive electrode to contain graphite fluoride and a metal fluoride. Especially, Patent Document No. 3 discloses that it is preferable to cover at least a part of the surface of the positive electrode active material particles formed of a lithium transition metal composite oxide or to allow the active material particles to contain fluorine.

Patent Document No. 4 refers to decomposition caused by oxidation of the separator in a battery which is set to be charged at a voltage exceeding 4.2 V. Specifically, Patent Document No. 4 reports the following: in the vicinity of a surface of the positive electrode in a high potential state, the oxidized atmosphere is stronger and so the separator in physical contact with the positive electrode is oxidized and so decomposed; therefore, micro short circuiting is likely to occur especially under a high temperature, which lowers a battery characteristic such as a cycle characteristic or a high-temperature storage characteristic. Patent Document No. 4 also proposes that, as means for solving this, in an electrode assembly including a positive electrode and a negative electrode facing each other while interposing the separator therebetween, a layer of resin having a high level of oxidation resistance such as poly(vinylidene fluoride), polytetrafluoroethylene or the like is located on a surface of the separator, the surface facing the positive electrode.

- Patent Document No. 1: Japanese Laid-Open Patent Publication No. 8-264183
- Patent Document No. 2: Japanese Laid-Open Patent Publication No. 2000-128539
- Patent Document No. 3: Japanese Laid-Open Patent Publication No. 2007-103119
- Patent Document No. 4: Japanese Laid-Open Patent Publication No. 2006-286531

DISCLOSURE OF THE INVENTION

Problems to be Solved by the Invention

As a result of detailed studies, the present inventors found that when a lithium ion secondary battery operates at a high voltage such that the positive electrode is charged up to a potential of 4.3 V to 5.0 V with respect to the potential at which lithium is dissolved and deposited, micro shortcircuiting caused by the oxidation of the separator as reported by Patent Document No. 4 is more serious than the decline of the reliability caused by the oxidation of the electrolyte solution.

The detailed studies conducted by the present inventors also found the following regarding the methods of Patent Documents Nos. 1 through 3. Since the particles are covered with an inactive metal fluoride, the activity of the surface of the positive electrode active material is decreased. Therefore, the occlusion and releasing reactivity of lithium ions caused by charge/discharge is also reduced, which makes it difficult to provide a high-rate charge/discharge characteristic considered to be necessary for practical use.

With the method proposed by Patent Document No. 4, it is possible to suppress the occurrence of the above-described micro shortcircuiting in the separator. However, it is preferable that the separator has a function of closing the holes to stop the electrode reaction in a temperature range of 120 to 140° C. when external shortcircuiting occurs (shutdown effect) from the viewpoint of safety. Where a resin layer having a high level of oxidation resistance is used, it is difficult to provide such a function. Therefore, the separator needs to have a layered structure including a polyethylene microporous layer having such a function and a resin layer having a high level of oxidation resistance for suppressing the oxidation. This presents problems that the production cost is raised and the productivity is lowered due to the increase of the number of production steps.

Since the resin layer having a high level of oxidation resistance is added to the separator, the volume ratio of the active material with respect to the battery is decreased by the volume of the resin layer. This reduces the battery capacity.

Moreover, fluorine resins such as poly(vinylidene fluoride), polytetrafluoroethylene and the like and aramid resins, which have been proposed as resins for the layer having a high level of oxidation resistance, cost higher than low-cost polyolefin materials such as polyethylene and the like and presents the problem of raising the material cost.

The present invention for solving these problems of the conventional art has an object of providing a nonaqueous electrolyte secondary battery having high reliability even after being charged/discharged at a high voltage.

Means for Solving the Problems

A nonaqueous electrolyte secondary battery according to the present invention includes a positive electrode and a negative electrode which are capable of reversibly occluding and releasing lithium; a resin layer provided between the positive electrode and the negative electrode; a battery case accommodating the positive electrode, the negative electrode and the resin layer; a nonaqueous electrolyte solution filling the battery case; and an insulating layer interposed, at least partially, between the positive electrode and the resin layer, the insulating layer containing aluminum fluoride.

In a preferable embodiment, the insulating layer is provided on at least a part of a surface of the positive electrode, the surface facing the resin layer.

In a preferable embodiment, the resin layer is a separator having no electron conductivity; and the insulating layer is provided on at least a part of a surface of the separator, the surface facing the positive electrode.

In a preferable embodiment, the insulating layer is microporous.

In a preferable embodiment, the insulating layer has a thickness of 10 nm or greater and 1 μm or less.

In a preferable embodiment, the nonaqueous electrolyte solution contains at least one type of fluorine-containing lithium salt.

In a preferable embodiment, the fluorine-containing lithium salt is one selected from the group consisting of lithium hexafluorophosphate and lithium tetrafluoroborate.

In a preferable embodiment, the resin layer is a separator having no electron conductivity.

In a preferable embodiment, the separator is a microporous sheet having a polyolefin resin as a main component.

In a preferable embodiment, the polyolefin resin contains polyethylene.

A separator for a nonaqueous electrolyte secondary battery according to the present invention includes a microporous resin layer having a pair of main surfaces and containing a polyolefin resin as a main component; and an aluminum or an aluminum fluoride cover film formed on at least a part of one of the pair of main surfaces, the separator having liquid and gas permeability.

In a preferable embodiment, the polyolefin resin contains at least polyethylene.

In a preferable embodiment, a method for producing a nonaqueous electrolyte secondary battery according to the present invention includes the steps of preparing a positive electrode capable of reversibly occluding and releasing lithium and having an aluminum-containing cover film formed on at least a part of a surface thereof, a negative electrode capable of reversibly occluding and releasing lithium, and a resin layer; impregnating an electrode assembly, in which the positive electrode and the negative electrode are located to interpose the resin layer therebetween such that the cover film of the positive electrode faces the resin layer, with a nonaqueous electrolyte solution containing an organic solvent and at least one type of fluorine-containing lithium salt; and charging the electrode assembly impregnated with the nonaqueous electrolyte solution to react the fluorine-containing lithium salt in the nonaqueous electrolyte solution with the cover film, thereby forming an aluminum fluoride-containing insulating layer on at least a part of the surface of the positive electrode, the surface facing the resin layer.

A method for producing a nonaqueous electrolyte secondary battery according to the present invention includes the steps of preparing a positive electrode and a negative electrode which are capable of reversibly occluding and releasing lithium and a separator having an aluminum cover film formed on at least a part of a surface thereof; impregnating an electrode assembly, in which the positive electrode and the negative electrode are located to interpose the separator therebetween such that the cover film faces the positive electrode, with a nonaqueous electrolyte solution containing an organic solvent and at least one type of fluorine-containing lithium salt; and charging the electrode assembly impregnated with the nonaqueous electrolyte solution to react the fluorine-containing lithium salt in the nonaqueous electrolyte solution with the cover film, thereby forming an aluminum fluoride-containing insulating layer on at least a part of the surface of the separator, the surface facing the positive electrode.

Effects of the Invention

According to the present invention, an insulating layer is provided between the positive electrode and the negative electrode. Therefore, the contact between the resin layer and the positive electrode is prevented. Even if the lithium ion secondary battery is charged at a high voltage, a part of the resin layer which faces the positive electrode is not exposed to an oxidized atmosphere, and thus oxidation of the resin layer and the decomposition caused by the oxidation are suppressed. Accordingly, a highly reliable lithium ion having a splendid high-rate charge/discharge characteristic and capable of suppressing the occurrence of micro shortcircuiting can be realized.

Figure 1A:
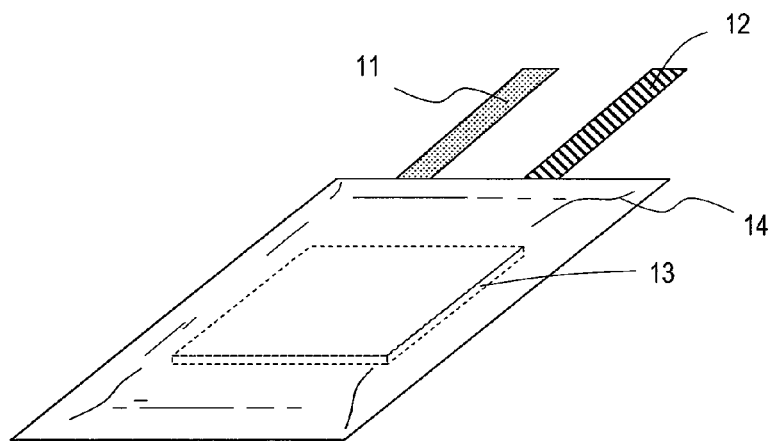
FIG. 1A is a perspective view showing a nonaqueous electrolyte secondary battery in Embodiment 1 according to the present invention.

DESCRIPTION OF THE REFERENCE NUMERALS 1, 101 Positive electrode
1a, 101a Positive electrode current collector
1b, 101b Positive electrode compound
1c, 103b Insulating layer
2, 102 Negative electrode
2a, 102a Negative electrode current collector
2b Lithium metal
3, 103a Separator
11, 111 Positive electrode lead
12, 112 Negative electrode lead
13, 113 Electrode assembly
1' Insulating layer-provided positive electrode
102b Negative electrode compound
103 Insulating layer-provided separator

BEST MODE FOR CARRYING OUT THE INVENTION

Embodiment 1

Figure 1B:
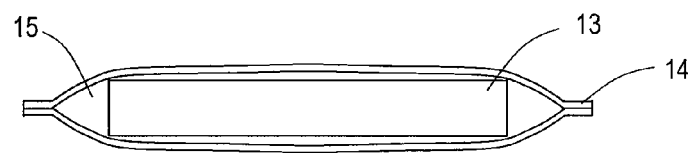
FIG. 1B is a cross-sectional view showing the nonaqueous electrolyte secondary battery in Embodiment 1 according to the present invention.

Hereinafter, a Nonaqueous Electrolyte Secondary battery in Embodiment 1 according to the present invention will be described with reference to the drawings. FIGS. 1A and 1B are respectively an perspective view and a cross-sectional view of a nonaqueous electrolyte secondary battery in Embodiment 1 according to the present invention.

Figure 2:
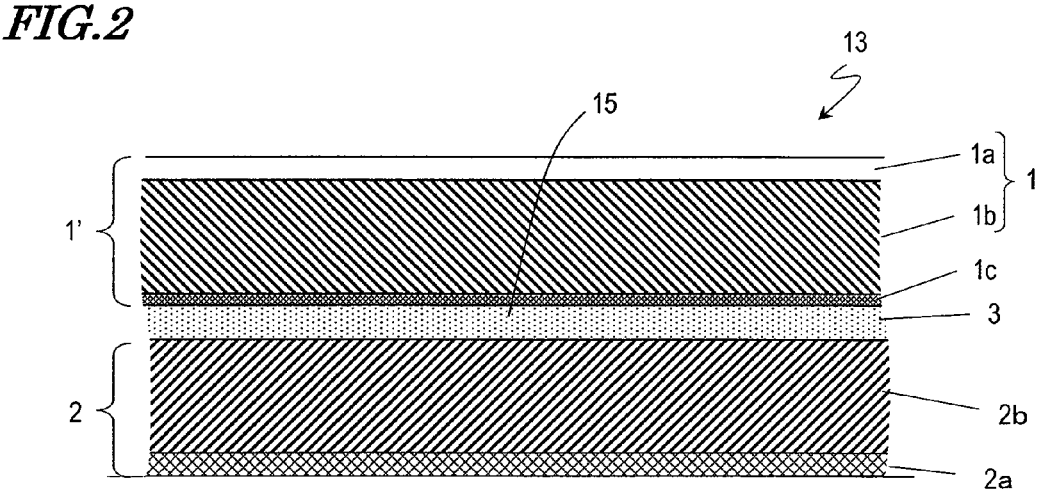
FIG. 2 is a cross-sectional view of an electrode assembly of the nonaqueous electrolyte secondary battery shown in FIGS. 1A and 1B.

The nonaqueous electrolyte secondary battery in this embodiment includes an electrode assembly 13, a battery case 14 accommodating the electrode assembly 13, and a nonaqueous electrolyte solution 15 filling the battery case 14. FIG. 2 is an enlarged cross-sectional view of the electrode assembly 13. The electrode assembly 13 includes a positive electrode 1, a negative electrode 2, a separator 3 provided between the positive electrode 1 and the negative electrode 2, and an insulating layer 1c provided between the positive electrode and the separator 3. As shown in FIG. 2, the insulating layer 1c is provided on a surface of the positive electrode 1, the surface being in contact with the separator 3, and thus forms an insulating layer-provided positive electrode 1'. More specifically, the positive electrode 1 includes a positive electrode current collector 1a and a positive electrode compound 1b carried on one surface of the positive electrode current collector 1a, and the insulating layer 1c is attached to one of a pair of main surfaces of the positive electrode compound 1b, on which the positive electrode current collector 1a is not provided. The insulating layer 1c is formed of a material containing aluminum fluoride as a main component, and prevents the separator 3 from being oxidized.

As described above, an important issue to be solved in the case where a lithium ion secondary battery is charged/discharged at a high voltage in order to improve the utilization factor of the active material thereof and thus to realize a large capacity is to prevent the occurrence of micro shortcircuiting caused by the oxidation of the separator.

According to a detailed investigation of the present inventors, in an environment in which the charge/discharge voltage of a lithium ion secondary battery is 4.3 V to 5.0 V, a part of the separator which is in the vicinity of an interface with the positive electrode contacts the positive electrode in a high potential state, and thus is exposed to an oxidized atmosphere (electrically oxidized state). As a result, this part of the separator is oxidized and so decomposed. Such an oxidized atmosphere is considered to be generated due to contact with the positive electrode which is in a high potential state. Therefore, such oxidation is considered to generally occur only in the vicinity of the interface between the separator and the positive electrode and not to proceed to the inside of the separator. Namely, even though the separator is oxidized by the positive electrode being put into a high potential state, the oxidation only occurs in the vicinity of the surface of the separator and does not proceed to the inside thereof. For this reason, it is unlikely that the separator is oxidized and so decomposed in the entirety of a thickness direction thereof to such a degree that micro shortcircuiting occurs between the positive electrode and the negative electrode.

However, according to the investigation of the present inventors, where the separator is formed of polyethylene, a conjugated double bond is generated by the oxidation, which allows electrons to more easily move in the separator. As a result, as the charge/discharge cycle is repeated for a long time, the oxidation reaction of the separator proceeds to the inside thereof. This causes the separator to be oxidized and so decomposed in the entirety of the thickness direction thereof, and thus causes micro shortcircuiting.

Based on such knowledge, in the lithium ion secondary battery in this embodiment, the insulating layer $1c$ is provided on the surface of the positive electrode 1, the surface being in contact with the separator. Owing to this, as shown in FIG. 2, the insulating layer $1c$ exists between the separator 3 and the positive electrode 1. The separator 3 is electrically isolated from the positive electrode 1 and is out of electrical contact with the positive electrode 1. As a result, even though the positive electrode 1 is kept at a high potential of 4.3 V to 5.0 V, no part of the separator is exposed to the oxidized atmosphere generated by the potential of the positive electrode 1. Therefore, no part of the separator 3 is oxidized, and the oxidation of the separator in the entire thickness direction thereof does not occur. Accordingly, a highly reliable lithium ion secondary battery capable of preventing the occurrence of micro shortcircuiting even though the battery is charged/discharged at a high voltage and the charge/discharge cycle is repeated for a long time is realized.

According to the technologies described in Patent Documents Nos. 1 and 2, the surface of the active material particles used to form the positive electrode is covered with a metal fluoride or a metal halide. Therefore, the separator is electrically insulated from the positive electrode active material particles at an interface between the positive electrode and the separator. However, the positive electrode occasionally contains a conductor in addition to the positive electrode active material. In this case, the separator is put into electrical contact with the positive electrode when contacting the conductor. Namely, the technologies described in Patent Documents Nos. 1 and 2 do not necessarily completely insulate the separator from the positive electrode electrically, and therefore do not necessarily prevent the oxidation of the separator with certainty.

According to the technologies described in Patent Documents Nos. 1 and 2, even in the inside of the positive electrode which is not in direct contact with the separator, the surface of the active material particles is covered with a metal fluoride or a metal halide. In general, a particle of an active material of a positive electrode occludes and releases lithium ions using the electrolyte solution impregnating the positive electrode and thus gives and receives electrons to and from adjacent particles of the active material and the conductor. As a result, an electrochemical reaction occurs and the battery is charged/discharged. In the case where the surface of the active material particles is covered with an insulating substance by the technology described in Patent Document No. 1 or 2, an electrochemical reaction may possibly be inhibited. This increases the resistance of the electrode against the reaction, which is considered to deteriorate the electrode characteristics including the high-rate charge/discharge characteristic.

In the case where the active material particles do not act as the active material at all by being covered with a metal fluoride or a metal halide, components which are not involved in the electrode reaction exist in the electrode. When this occurs, the charge capacity provided by the normally acting active material is reduced, which presents a problem that the battery capacity is reduced.

By contrast, according to this embodiment, the insulating layer $1c$ is provided in a layered state only in a surface portion of the positive electrode compound $1b$ containing active material, and is not existent inside the positive electrode compound $1b$. Therefore, the electrochemical reaction inside the positive electrode is not inhibited, and the function of the positive electrode is not spoiled. Owing to this, the electrode characteristics are not deteriorated and splendid battery characteristics are provided. Since the insulating layer $1c$ is not provided inside the positive electrode, the ratio of the insulating layer $1c$ is kept minimum, and so the battery capacity is not reduced almost at all.

Figure 3:
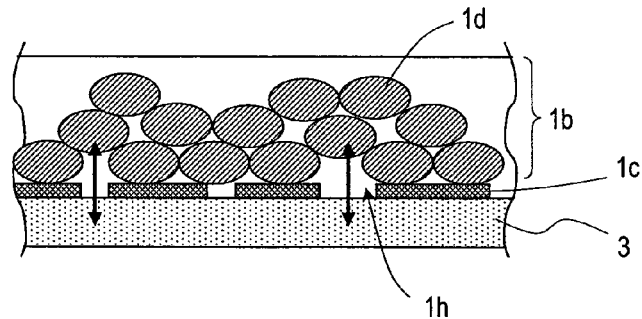
FIG. 3 is an enlarged cross-sectional view of a separator and the vicinity thereof in the electrode assembly.

FIG. 3 is an enlarged schematic view of a structure of the insulating layer $1c$ and the vicinity thereof. As shown in FIG. 3, the insulating layer $1c$ has micropores $1h$. The positive electrode compound $1b$ contains positive electrode active material particles $1d$. As described above, the surface of the positive electrode active material particles $1d$ is not covered with the insulating layer $1c$. The micropores $1h$ allow the nonaqueous electrolyte solution 15 filling the battery case 14 to fill a portion between the negative electrode 2 and the positive electrode 1 through the separator 3. Thus, the lithium ions and the electrolysis in the electrolyte solution 15 can move toward the positive electrode compound $1b$, or toward the negative electrode 2 via the separator 3, as represented by the arrows. The micropores $1h$ may have any size as long as the surface of the positive electrode does not contact the surface of the separator. The size of the micropores $1h$ may occasionally rely on the shape of the particles of the material of the positive electrode or the shape of the surface of the electrode.

It is preferable that the insulating layer $1c$ has a thickness of 10 nm or greater and 1 μm or less. A more preferable thickness is 10 nm or greater and 50 nm or less. When the thickness of the insulating layer $1c$ is less than 10 nm, the insulating effect is not sufficiently provided. When the thickness of the insulating layer $1c$ exceeds 1 μm, the ratio of the insulating layer $1c$, which does not contribute to the battery capacity, with respect to the battery case is too high, and so the battery capacity is reduced. Where the thickness of the insulating layer $1c$ is kept 50 nm or less, the reduction of the battery capacity can be suppressed.

It is preferable that the ratio of the part of the surface of the positive electrode covered by the insulating layer $1c$ with respect to the entirety of the surface of the positive electrode which is in contact with the separator is 50% or greater and 100% or less. When the ratio is less than 50%, the effect of suppressing the oxidation of the separator 3 is not sufficiently provided.

As is clear from the above description, the insulating layer $1c$ is provided between the positive electrode compound $1b$ of the positive electrode 1 and the separator 3. The insulating layer 1c may be formed of an insulating material such as silicon oxide, silicon nitride or the like as long as the insulating layer 1c can electrically insulate the separator 3 from the positive electrode compound 1b.

According to the present invention, special attention is paid to the nonaqueous electrolyte solution 15 containing fluorine-containing ions. The insulating layer 1c is formed of aluminum fluoride, which is obtained by reacting aluminum with the fluorine component in the nonaqueous electrolyte solution 15. After the positive electrode 1 is formed, an aluminum film is formed on the surface of the positive electrode 1. While the lithium ion secondary battery produced in this manner is processed with initial charge, aluminum reacts with the fluorine component in the nonaqueous electrolyte solution 15. Thus, the insulating layer 1c of aluminum fluoride is formed.

Figure 4:
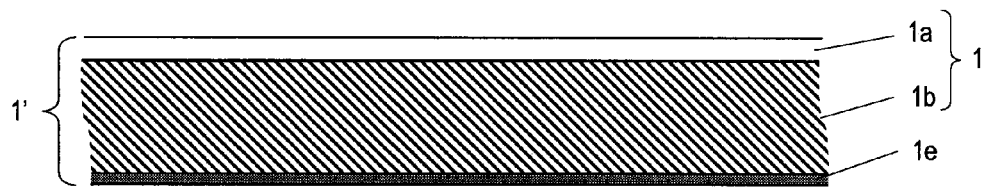
FIG. 4 is a cross-sectional view showing a state in the middle of production of an insulating layer.

Specifically, the lithium ion secondary battery is produced as follows. First, as shown in FIG. 4, the positive electrode compound 1b is formed on the positive electrode current collector 1a to form the positive electrode 1. On the surface of the positive electrode compound 1b, an aluminum cover film 1e is formed by a thin film formation technology. Then, the positive electrode 1' having the aluminum cover film 1e formed on the surface thereof is provided to face the negative electrode with the separator being interposed therebetween to form the electrode assembly. After the electrode assembly is accommodated in the battery case, the battery case is filled with a nonaqueous electrolyte solution obtained by dissolving a fluorine-containing lithium salt such as lithium hexafluorophosphate, lithium tetrafluoroborate or the like in an organic solvent. Thus, the lithium ion secondary battery is completed.

Next, this lithium ion secondary battery is processed with initial charge. As a result, the aluminum cover film 1e reacts with the fluorine component in the electrolyte solution during the charging, and as shown in FIG. 2, the insulating layer 1c of aluminum fluoride is formed.

Instead of by the reaction with the fluorine component in the nonaqueous electrolyte solution, the aluminum cover film 1e may be fluorided by exposing the cover film 1e formed on the positive electrode 1 to fluorine gas, by treating the cover film 1e with a solution containing hydrogen fluoride, or by reacting the cover film 1e with a fluorine-containing compound.

The aluminum cover film 1e may be formed by a vacuum process such as sputtering, vapor deposition or the like. Instead of the vacuum process, the aluminum cover film 1e may be formed by gas deposition, aerosol deposition or the like, by which a gas flow containing aluminum micropowder is jetted from a nozzle and caused to collide against the substrate to form a film. The aluminum cover film 1e may also be formed by any other method usable for forming an aluminum cover film. Alternatively, the insulating layer 1c formed of aluminum fluoride may be directly formed on the surface of the positive electrode 1 using a thin film formation technology such as sputtering or the like.

What should be noted is that the method of producing a battery using the positive electrode having an aluminum cover film and then fluoriding aluminum by the reaction with the fluorine component in the electrolyte solution is simpler and costs less than the method of producing the battery after the aluminum cover film is fluorided or the method of forming the cover film using aluminum fluoride.

The insulating layer 1c only needs to contain aluminum fluoride and may also contain any other insulating aluminum compound such as aluminum oxide, aluminum hydroxide, aluminum nitride or the like. The aluminum cover film does not need to be completely fluorided. As long as the insulating layer 1c containing aluminum fluoride is formed to a thickness of 10 nm or greater on the side of the separator 3, the aluminum cover film may exist on the remaining part, namely, on the side of the positive electrode compound 1b. In this case, aluminum may contain a chemical element such as silicon, iron, copper, manganese, magnesium, zinc, titanium or the like. However, in order to form the insulating layer 1c in a simple manner and at relatively low cost with a sufficient insulating property being guaranteed, it is preferable that the insulating layer 1c containing aluminum fluoride as a main component is formed to a thickness of 10 nm or greater on the surface of the positive electrode 1, the surface facing the separator 3.

Patent Documents Nos. 1 and 2 disclose, as a method for forming a metal halide cover film on the surface of the active material particles, a method of exposing active material powder to fluorine gas to fluoride the surface thereof, a method of synthesizing the cover film by using a lithium compound, a metal halide and a transition metal-containing compound as starting materials and mixing and sintering these materials, and a mechanochemical method of mixing the active material powder and a fluorine compound in an automatic mortar. In the case where a metal halide cover film is formed on the surface of the active material particles by any of these methods to form a positive electrode, there is a high possibility that a cover layer is existent inside the positive electrode; specifically, between active material particles, between the active material particles and the conductor particles, and at an interface between the active material particles and the current collector. In such a case, as described above, the electrode reaction may be inhibited.

Japanese Laid-Open Patent Publication No. 11-45740 discloses a nonaqueous electrolytic battery in which metal halide powder having a particle diameter of 0.1 to 5 µm is added to the inside of the positive electrode and the negative electrode or to interfaces between the separator and these electrodes. The metal halide powder has a relatively low melting point of 100 to 300° C., and is provided in order to absorb the heat generated at the time of internal shortcircuiting owing to the heat of melting.

The metal halide powder is not provided for the purpose of electrically insulating the separator and the positive electrode from each other. Therefore, the present invention is different from the nonaqueous electrolytic battery disclosed in this publication in terms of structure. Aluminum fluoride has a melting point of 1040° C. A substance having such a high melting point is not usable to absorb the heat generated at the time of internal shortcircuiting. On these points, the technology disclosed by Japanese Laid-Open Patent Publication No. 11-45740 is totally different from the present invention.

Hereinafter, the nonaqueous electrolyte secondary battery in the embodiment according to the present invention will be described in detail, again with reference to FIGS. 1 and 2.

As described above, the positive electrode 1 includes the positive electrode current collector 1a and the positive electrode compound 1b. Owing to the insulating layer 1c provided on the surface of the positive electrode 1, the insulating layer-provided positive electrode 1' is formed. As shown in FIG. 1A, the positive electrode current collector 1a is connected to an aluminum lead 11 provided for external connection.

The positive electrode current collector 1a may be formed of any of various electron conductive materials which are not chemically changed at the charge/discharge potential of a positive electrode active material to be used. Materials usable for the positive electrode current collector 1a include, for example, stainless steel, aluminum, titanium, carbon, conductive resins and the like. It is preferable that the surface of the positive electrode current collector 1a is provided with a concaved and convexed pattern by surface treatment. The positive electrode current collector 1a is formed of any of the above-described materials and is provided in the form of foil, film, sheet, net, punched body, lath body, porous body, foamed body, fiber, mold of unwoven cloth or the like. The thickness of the positive electrode current collector 1a is not specifically limited, but is preferably 1 μm or greater and 500 μm or less.

The positive electrode compound 1b contains a positive electrode active material. It is preferable to use a lithium-containing transition metal oxide as the positive electrode active material. For example, $Li_xCoO_2$, $Li_xNiO_2$, $Li_xMnO_2$, $Li_xCo_yNi_{1-y}O_2$, $Li_xCo_yM_{1-y}O_z$, $Li_xNi_{1-y}M_yO_z$, $Li_xMn_2O_4$ or $Li_xMn_{2-y}M_yO_4$ (M=at least one of Na, Mg, Sc, Y, Mn, Fe, Co, Ni, Cu, Zn, Al, Cr, Pb, Sb and B; x=0 to 1.2; y=0 to 0.9; z=1.7 to 2.3) is usable as the positive electrode active material. In addition, any other material with which the potential at the time of charging exceeds 4 V with respect to lithium provides the effects of the present invention. A plurality of different materials may be mixed for the positive electrode. In the case where the positive electrode active material is powdery, the average particle diameter is not specifically limited but is preferably 0.1 μm or greater and 30 μm or less. The positive electrode active material may be formed as a thin film on the current collector.

The positive electrode compound 1b may contain only the positive electrode active material, or may further contain either one of, or both of, a conductor and a binder.

Usable as the conductor is any of various electron conductive materials which are not chemically changed at the charge/discharge potential of a positive electrode active material to be used. Materials usable as the conductor include, for example, graphite materials; carbon black materials; conductive fiber materials such as carbon fiber, metal fiber and the like; metal powder materials; conductive whiskers; conductive metal oxides; organic conductive materials; and the like. These materials may be used independently or as a mixture of two or more. The amount of the conductor is not specifically limited, but is preferably 1 to 50% by weight, and is especially preferably 1 to 30% by weight, with respect to the positive electrode active material.

The binder may be either a thermoplastic resin or a thermosetting resin. Materials preferably usable as the binder include, for example, polyolefin resins such as polyethylene, polypropylene and the like; fluorine-based resins such as polytetrafluoroethylene (PTFE), poly(vinylidene fluoride) (PVDF), hexafluoropropylene (HFP) and the like; copolymeric resins thereof; styrene-butadiene rubber; polyacrylic acid and copolymeric resins thereof; and the like.

In addition to the conductor and the binder, a filler, a dispersant, an ion conductor, a pressure enhancing agent and any of various other additives may be added to the positive electrode compound 1b. Usable as the filler is any of various fiber materials which are not chemically changed in a battery.

As shown in FIG. 2, the negative electrode 2 includes a negative electrode current collector 2a and a negative electrode compound 2b carried on one surface of the negative electrode current collector 2a. The negative electrode current collector 2a may be formed of any material known as a material for the negative electrode current collector of a lithium ion secondary battery, for example, copper, nickel, stainless steel or the like. The negative electrode compound 2b contains a negative electrode active material. When necessary, the negative electrode compound 2b is formed into a paste together with a conductive material such as acetylene black, graphite powder, a fiber carbon material or the like; a binder such as styrene-butadiene rubber, poly(vinylidene fluoride) or the like; or a thickener such as carboxymethyl batteryulose or the like. The paste is applied to the negative electrode current collector 2a and dried. Thus, the negative electrode compound 2b is carried on one surface of the negative electrode current collector 2a. The negative electrode compound 2b containing a negative electrode active material may be formed on the negative electrode current collector 2a in the form of a foil by vapor deposition or sputtering. As shown in FIG. 1A, the negative electrode current collector 2a is connected to a nickel lead 12 provided for external connection.

As the negative electrode active material, any known negative electrode active material capable of reversibly occluding and releasing lithium is usable. Materials usable as the negative electrode active material include, for example, graphite materials such as natural graphite, artificial graphite and the like which are conventionally used for a nonaqueous electrolyte secondary battery; amorphous carbon materials; compounds and oxides known as being formed into an alloy with Li, e.g., Al, Sn, Si, etc.; and the like.

The separator 3 is a resin layer formed of a resin having no electron conductivity. The separator 3 is a microporous film having a large ion permeability, and prescribed mechanical strength and electric insulating property. The separator 3 has a function of closing the pores at a temperature of, preferably, 100° C. or higher and 200° C. or lower to increase the resistance against ion permeation (shutdown effect). It is preferable to use, as the separator 3, a polyolefin resin such as polypropylene, polyethylene or the like independently or a combination thereof, because these materials are superb in the resistance against an organic solvent and hydrophobicity. Polyethylene is more preferable for the separator because polyethylene has the above-described shutdown effect. Especially where a material which causes an oxidation reaction in a potential region of 4 V or greater with respect to lithium and as a result is deteriorated in performance, for example, polyethylene, is used, the effects of the present invention are provided.

It is preferable that the pores of the separator 3 have a diameter in such a range that does not allow the active material, the binder and the conductor detached from the positive electrode compound 1b or the negative electrode compound 2b to pass the pores, for example, 0.01 to 1 μm. The thickness of the separator 3 is generally selected from the range of 5 to 100 μm. The porosity is determined based on the electron or ion permeability, the material or the film pressure, and is preferably 30 to 80% in general. The separator 3 may be obtained by stacking microporous films having different compositions. For example, the separator 3 may be a multi-layer film of polypropylene and polyethylene from the viewpoint of heat resistance and pore closability.

The lithium ion secondary battery according to the present invention may include, instead of the separator 3, a resin layer, which is swollen as a result of containing the electrolyte solution to act as a gel electrolysis and has electron conductivity, between the positive electrode 1 and the negative electrode 2. In this case, an effect is provided that the resin component forming the gel electrolysis is suppressed from being oxidized and so deteriorated. Namely, in a lithium ion secondary battery including a resin layer for holding a non-aqueous electrolyte solution, for example, a resin layer acting as a separator or a gel electrolysis, between the positive electrode 1 and the negative electrode 2, an effect is provided that the resin layer is suppressed from being oxidized and so deteriorated.

The nonaqueous electrolyte solution 15 is formed of a nonaqueous solvent and a lithium salt soluble in the nonaqueous solvent. As the nonaqueous solvent, any known nonaqueous solvent is usable with no specific limitation. Usable nonaqueous solvents include, for example, cyclic carbonates such as ethylene carbonate (EC), propylene carbonate (PC), butylene carbonate (BC) and the like; and non-proton organic solvents such as dimethyl carbonate (DMC), diethyl carbonate (DEC), ethylmethyl carbonate (EMC) and the like. These materials are used independently or as a mixture of two or more. It is especially preferable to use a nonaqueous solvent containing at least ethylene carbonate or propylene carbonate having a high dielectric constant in order to provide a splendid high-load discharge characteristic.

As the lithium salt soluble in the nonaqueous solvent, any known lithium salt is usable with no specific limitation. Usable lithium salts include, for example, $LiClO_4$, $LiBF_4$, $LiPF_6$, $LiAlCl_4$, $LiSbF_6$, LiSCN, LiCl, $LiCF_3SO_3$, $LiCF_3CO_2$, $Li(CF_3SO_2)_2$, $LiAsF_6$, $LiN(CF_3SO_2)_2$, $LiB_{10}Cl_{10}$, lower aliphatic lithium carboxylate, LiCl, LiBr, LiI, chloroborane lithium, lithium tetraphenylborate, and the like. One of, or a combination of two or more, of these materials may be dissolved in the nonaqueous solvent to be used.

Especially in the case where $LiBF_4$ (lithium tetrafluoroborate) or $LiPF_6$ (lithium hexafluorophosphate) among the above-described lithium salts is used, merely by forming an aluminum cover film on the surface of the positive electrode 1, the aluminum cover film can be fluorided during the initial charge to form the insulating layer 1c. Therefore, use of $LiBF_4$ or $LiPF_6$ allows the insulating layer 1c to be formed by a simple process.

As shown in FIG. 1A, the battery case 14 accommodates the electrode assembly 13. The battery case 14 is filled with the nonaqueous electrolyte solution 15, which permeates to the inside of the electrode assembly 13. The battery case 14 may be a bag of laminated film which is obtained by laminating a resin film on both surfaces of a metal battery can or metal foil of Al, Fe or the like. It is preferable to use a laminated film battery case in order to realize a lightweight and thin secondary battery.

The battery case 14 may have any shape with no specific limitation, and may be, for example, coin-shaped, sheet-shaped, polygonal, sufficiently large to be used for electric automobiles or the like. The nonaqueous electrolyte secondary battery according to the present invention is usable for mobile information terminals, mobile electronic devices, home-use compact power storage devices, automatic two-wheel vehicles, electric automobiles, hybrid electric automobiles and the like.

Figure 5:
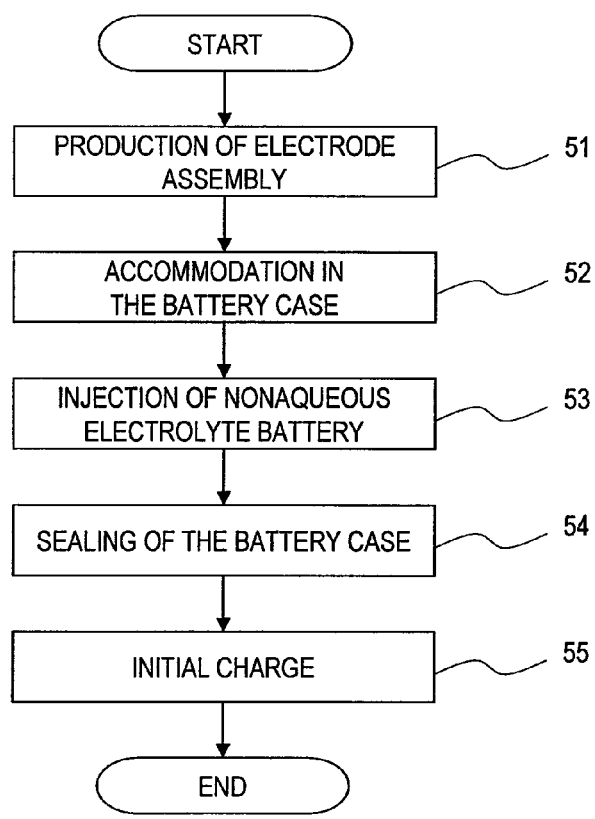
FIG. 5 is a flowchart showing a method for producing the nonaqueous electrolyte secondary battery in Embodiment 1 according to the present invention.

Such a nonaqueous electrolyte secondary battery may be produced by, for example, the following method. FIG. 5 is a flowchart showing an example of a method for producing the nonaqueous electrolyte secondary battery.

First, the electrode assembly 13 is produced (step 51). As described above, the electrode assembly 13 is produced by stacking the separator 3 between the positive electrode 1, having the aluminum cover film 1e located on the surface of the positive electrode compound 1b as shown in FIG. 4, and the negative electrode 2.

Next, the electrode assembly 13 is accommodated in the battery case 14 (step 52), and the nonaqueous electrolyte solution 15 is injected into the battery case 14 (step 53). The injection of the nonaqueous electrolyte solution 15 is usually performed at room temperature and atmospheric pressure, but may be performed at a higher temperature and a higher pressure in the case where the nonaqueous electrolyte solution 15 has a high viscosity. It is preferable that after the nonaqueous electrolyte solution is injected, the impregnation of the inside of the electrode assembly with the nonaqueous electrolyte solution 15 is promoted by putting the inside of the battery case into a reduced pressure state for deaeration and then returning the pressure of the inside of the battery case to atmospheric pressure.

After the nonaqueous electrolyte solution is injected, an opening of the battery case is tightly closed to seal the battery case (step 54). In the case where the battery case 14 is formed of a laminated film, it is preferable to use thermal fusion to close the opening. Before tightly closing the opening of the battery case, the inside of the battery case may be put into a reduced pressure state.

Next, the battery is processed with initial charge (step 55). During the initial charge, the aluminum cover film 1e reacts with the fluorine component in the electrolyte solution and thus the insulating layer 1c of aluminum fluoride is formed as shown in FIG. 2. Thus, the nonaqueous electrolyte secondary battery is completed.

In the nonaqueous electrolyte secondary battery in this embodiment, the insulating layer is provided on the surface of the positive electrode, the surface being in contact with the separator, and the separator is electrically insulated from the positive electrode. Therefore, even though the lithium ion secondary battery is charged/discharged at a high voltage, the part of the separator facing the positive electrode is not exposed to the oxidized atmosphere, and so the separator is suppressed from being oxidized and from being decomposed by being oxidized. Accordingly, a highly reliable lithium ion secondary battery is realized, which has a splendid high-rate charge/discharge characteristic because of being chargeable/dischargeable at a high voltage, and suppresses the occurrence of micro shortcircuiting. Even the nonaqueous electrolyte secondary battery of the specifications of being charged/discharged at a high voltage can use a separator formed of a polyolefin, such as polyethylene or the like, which is low-cost but has a problem in oxidation resistance.

The insulating layer is provided only on the surface of the positive electrode, the surface being in contact with the separator. Therefore, the volume ratio of the insulating layer with respect to the lithium ion secondary battery is low, and the ratio of the substances which are not involved in the occlusion/release of lithium can be kept minimum. In addition, since the insulating layer does not cover the entire surface of the particles of the positive electrode active material, the positive electrode active material is not inactivated. For this reason, a large capacity can be realized.

Moreover, the aluminum cover film is formed on the surface of the positive electrode, and the aluminum cover film and the fluorine component in the nonaqueous electrolyte solution are reacted with each other. Thus, the insulating layer formed of aluminum fluoride can be formed. Therefore, the number of production steps which would be increased when the insulating layer is added to the lithium ion secondary battery, and the extra cost and time required by such an increase, can be saved.

Accordingly, a lithium ion secondary battery which suppresses the occurrence of micro shortcircuiting and thus is reliable, is highly productive, has a large capacity, and has a splendid high-rate charge/discharge characteristic is realized.

In this embodiment, the positive and negative electrodes each have a compound containing an active material provided on one surface of the respective current collector. Alternatively, a nonaqueous electrolyte secondary battery including an electrode assembly having a larger number of layers can also be carried out. In such an electrode assembly, positive and negative electrodes interposing therebetween a compound which has an active material on both surfaces thereof, and a separator carrying a cation-polymerizable polymer, are alternately stacked. Still alternatively, the present invention is preferably applicable to a nonaqueous electrolyte secondary battery including a jelly roll type electrode assembly, in which a positive electrode and a negative electrode interposing therebetween a separator carrying a cation-polymerizable polymer are rolled.

Embodiment 2

Figure 8A:
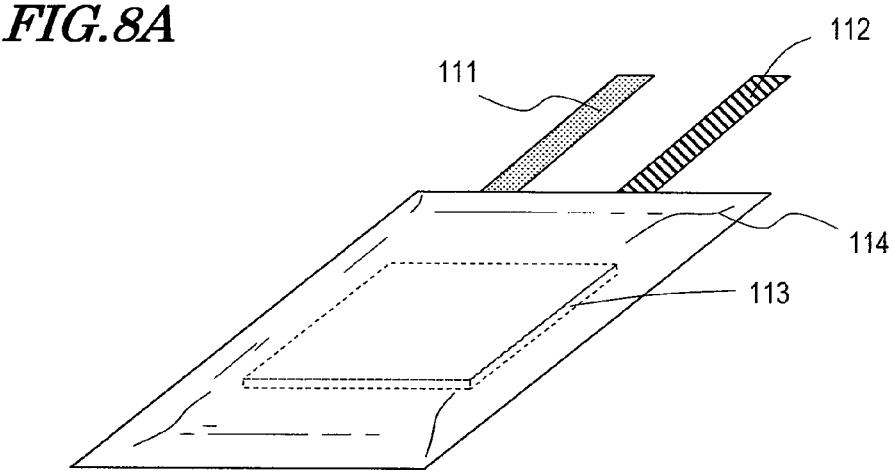
FIG. 8A is a perspective view showing a nonaqueous electrolyte secondary battery in Embodiment 2 according to the present invention.
Figure 8B:
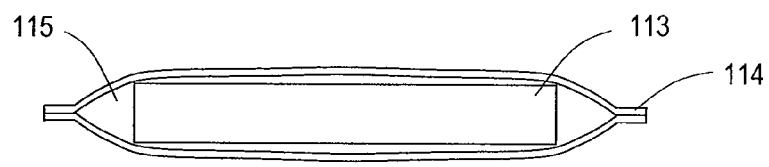
FIG. 8B is a cross-sectional view showing the nonaqueous electrolyte secondary battery in Embodiment 2 according to the present invention.

Hereinafter, a nonaqueous electrolyte secondary battery in Embodiment 2 according to the present invention will be described with reference to the drawings. FIGS. 8A and 8B are respectively an perspective view and a cross-sectional view of a nonaqueous electrolyte secondary battery in Embodiment 2 according to the present invention. Unlike in Embodiment 1, the nonaqueous electrolyte secondary battery in this embodiment has an insulating layer provided on the separator, not on the positive electrode.

Figure 9:
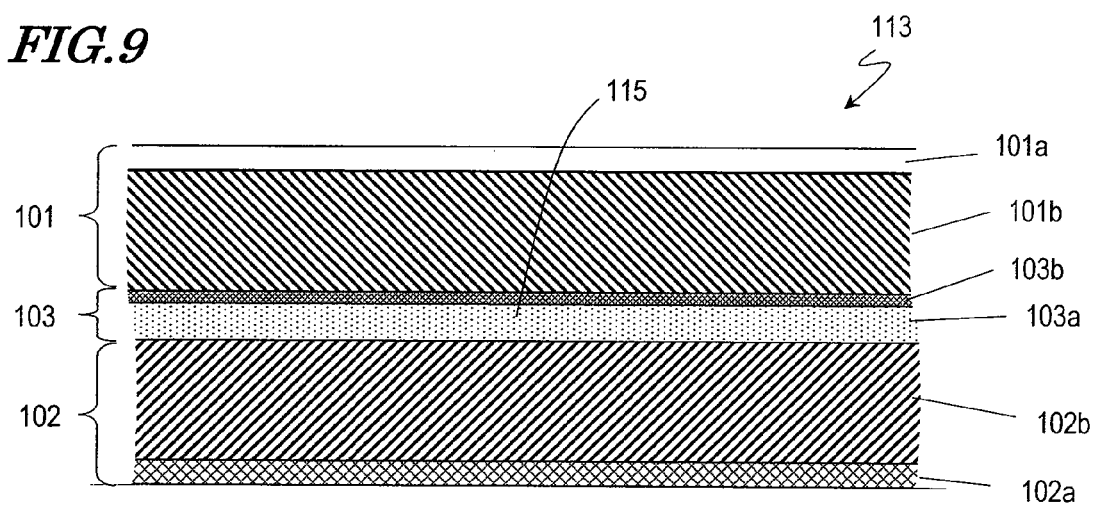
FIG. 9 is a cross-sectional view of an electrode assembly of the nonaqueous electrolyte secondary battery shown in FIGS. 8A and 8B.

The nonaqueous electrolyte secondary battery in this embodiment includes an electrode assembly 113, a battery case 114 accommodating the electrode assembly 113, and a nonaqueous electrolyte solution 115 filling the battery case 114. FIG. 9 is an enlarged cross-sectional view of the electrode assembly 113. The electrode assembly 113 includes a positive electrode 101, a negative electrode 102, a separator 103a provided between the positive electrode 101 and the negative electrode 102, and an insulating layer 103b provided between the positive electrode 101 and the separator 103a. As shown in FIG. 9, the insulating layer 103b is provided on at least a part of a surface of the separator 103a, the surface facing the positive electrode 101. The insulating layer 103b is attached to the separator 103a to form an insulating layer-provided separator 103.

The positive electrode 101 includes a positive electrode current collector 101a and a positive electrode compound 101b. As shown in FIG. 8A, the positive electrode current collector 101a is connected to an aluminum lead 111 provided for external connection.

The positive electrode current collector 101a may be formed of any of various electron conductive materials which are not chemically changed at the charge/discharge potential of a positive electrode active material to be used. Materials usable for the positive electrode current collector 101a include, for example, stainless steel, aluminum, titanium, carbon, conductive resins and the like. It is preferable that the surface of the positive electrode current collector 101a is provided with a concaved and convexed pattern by surface treatment. The positive electrode current collector 101a is formed of any of the above-described materials and is provided in the form of foil, film, sheet, net, punched body, lath body, porous body, foamed body, fiber, mold of unwoven cloth or the like. The thickness of the positive electrode current collector 101a is not specifically limited, but is preferably 1 µm or greater and 500 µm or less.

The positive electrode compound 101b contains a positive electrode active material. Any known positive electrode active material which is capable of reversibly occluding and releasing lithium is usable. It is preferable to use a lithium-containing transition metal oxide. For example, $Li_xCoO_2$, $Li_xNiO_2$, $Li_xMnO_2$, $Li_xCO_yNi_{1-y}O_2$, $Li_xCO_yM_{1-y}O_z$, $Li_xNi_{1-y}M_yO_z$, $Li_xMn_2O_4$ or $Li_xMn_{2-y}M_yO_4$ (M=at least one of Na, Mg, Sc, Y, Mn, Fe, Co, Ni, Cu, Zn, Al, Cr, Pb, Sb and B; x=0 to 1.2; y=0 to 0.9; z=1.7 to 2.3) is usable as the positive electrode active material. In addition, any other material with which the potential at the time of charging exceeds 4 V with respect to lithium provides the effects of the present invention. A plurality of different materials may be mixed for the positive electrode. In the case where the positive electrode active material is powdery, the average particle diameter is not specifically limited but is preferably 0.1 µm or greater and 30 µm or less. The positive electrode active material may be formed as a thin film on the current collector.

The positive electrode compound 101b may contain only the positive electrode active material, or may further contain either one of, or both of, a conductor and a binder.

Usable as the conductor is any of various electron conductive materials which are not chemically changed at the charge/discharge potential of a positive electrode active material to be used. Materials usable as the conductor include, for example, graphite materials; carbon black materials; conductive fiber materials such as carbon fiber, metal fiber and the like; metal powder materials; conductive whiskers; conductive metal oxides; organic conductive materials; and the like. These materials may be used independently or as a mixture of two or more. The amount of the conductor is not specifically limited, but is preferably 1 to 50% by weight, and is especially preferably 1 to 30% by weight, with respect to the positive electrode active material.

The binder may be either a thermoplastic resin or a thermosetting resin. Materials preferably usable as the binder include, for example, polyolefin resins such as polyethylene, polypropylene and the like; fluorine-based resins such as polytetrafluoroethylene (PTFE), poly(vinylidene fluoride) (PVDF), hexafluoropropylene (HFP) and the like; copolymeric resins thereof; styrene-butadiene rubber; polyacrylic acid and copolymeric resins thereof; and the like.

In addition to the conductor and the binder, a filler, a dispersant, an ion conductor, a pressure enhancing agent and any of various other additives may be added to the positive electrode compound 101b. Usable as the filler is any of various fiber materials which are not chemically changed in a battery.

As shown in FIG. 9, the negative electrode 102 includes a negative electrode current collector 102a and a negative electrode compound 102b carried on one surface of the negative electrode current collector 102a. The negative electrode current collector 102a may be formed of any material known as a material for the negative electrode current collector of a lithium ion secondary battery, for example, copper, nickel, stainless steel or the like. The negative electrode compound 102b contains a negative electrode active material. When necessary, the negative electrode compound 102b is formed into a paste together with a conductive material such as acetylene black, graphite powder, a fiber carbon material or the like; a binder such as styrene-butadiene rubber, poly(vinylidene fluoride) or the like; or a thickener such as carboxymethyl batteryulose or the like. The paste is applied to the negative electrode current collector 102a and dried. Thus, the negative electrode compound 102b is carried on one surface of the negative electrode current collector 102a. The negative electrode compound 102b containing a negative electrode active material may be formed on the negative electrode current collector 102a in the form of a foil by vapor deposition or sputtering. As shown in FIG. 8A, the negative electrode current collector 102a is connected to a nickel lead 112 provided for external connection.

As the negative electrode active material, any known negative electrode active material capable of reversibly occluding and releasing lithium is usable. Materials usable as the negative electrode active material include, for example, graphite materials such as natural graphite, artificial graphite and the like which are conventionally used for a nonaqueous electrolyte secondary battery; amorphous carbon materials; compounds and oxides known as being formed into an alloy with Li, e.g., Al, Sn, Si, etc.; and the like.

As shown in FIG. 9, the insulating layer-provided separator 103 has liquid and gas permeability, and includes the separator 103a and the insulating layer 103b. The insulating layer 103b is provided on at least a part of the surface of the insulating layer-provided separator 103, the surface being in contact with the positive electrode 101. The insulating layer 103b is formed of a material containing aluminum fluoride as a main component and thus prevents the separator 103 from being oxidized.

As described above in Embodiment 1, the lithium ion secondary battery in this embodiment includes the insulating layer 103b on the surface of the separator 103a, the surface being in contact with the positive electrode 101. Owing to this, as shown in FIG. 9, the insulating layer 103b exists between the separator 103a and the positive electrode 101. The separator 103a is electrically isolated from the positive electrode 101 and is out of electrical contact with the positive electrode 101. As a result, even though the positive electrode 101 is kept at a high potential of 4.3 V to 5.0 V, no part of the separator 103a is exposed to the oxidized atmosphere generated by the potential of the positive electrode 101. Therefore, no part of the separator 103a is oxidized, and the oxidation of the separator in the entire thickness direction thereof does not occur. Accordingly, a highly reliable lithium ion secondary battery capable of preventing the occurrence of micro short-circuiting even though the battery is charged/discharged at a high voltage and the charge/discharge cycle is repeated for a long time is realized.

As described above in Embodiment 1, according to the technologies described in Patent Documents Nos. 1 and 2, the surface of the active material particles used to form the positive electrode is covered with a metal fluoride or a metal halide. Therefore, the separator is electrically insulated from the positive electrode active material particles at an interface between the positive electrode and the separator. However, the positive electrode occasionally contains a conductor in addition to the positive electrode active material. In this case, the separator is put into electrical contact with the positive electrode when contacting the conductor. Namely, the technologies described in Patent Documents Nos. 1 and 2 do not necessarily electrically insulate the separator from the positive electrode completely, and therefore do not necessarily prevent the oxidation of the separator with certainty.

According to the technologies described in Patent Documents Nos. 1 and 2, even in the inside of the positive electrode which is not in direct contact with the separator, the surface of the active material particles is covered with a metal fluoride or a metal halide. In general, a particle of an active material of a positive electrode occludes and releases lithium ions using the electrolyte solution impregnating the positive electrode and thus gives and receives electrons to and from adjacent particles of the active material and the conductor. As a result, an electrochemical reaction occurs and the battery is charged/discharged. In the case where the surface of the active material particles is covered with an insulating substance by the technology described in Patent Document No. 1 or 2, an electrochemical reaction may possibly be inhibited. This increases the resistance of the electrode against the reaction, which is considered to deteriorate the electrode characteristics including the high-rate charge/discharge characteristic.

In the case where the active material particles do not act as the active material at all by being covered with a metal fluoride or a metal halide, components which are not involved in the electrode reaction exist in the electrode. When this occurs, the charge capacity provided by the normally acting active material is reduced, which presents a problem that the battery capacity is reduced.

By contrast, according to this embodiment, the insulating layer 103b is provided in a layered state only in a surface portion of the separator 103a. Therefore, the electrochemical reaction of the active material in the positive electrode is not inhibited, and the function of the positive electrode is not spoiled. Owing to this, the electrode characteristics are not deteriorated and splendid battery characteristics are provided. Since the insulating layer 103b is not provided in the positive electrode, especially in the positive electrode compound 101b, the ratio of the insulating layer 103b in the lithium ion secondary battery is kept minimum, and so the battery capacity is not reduced almost at all.

The separator 103a has a function of closing the pores at a temperature of, preferably, 100° C. or higher and 200° C. or lower to increase the resistance against ion permeation (shutdown effect). It is preferable to use, as the separator 103a, a polyolefin resin such as polypropylene, polyethylene or the like independently or a combination thereof, because these materials are superb in the resistance against an organic solvent and hydrophobicity. Polyethylene is more preferable for the separator because polyethylene has the above-described shutdown effect. Especially where a material which causes an oxidation reaction in a potential region of 4 V or greater with respect to lithium and as a result is deteriorated in performance, for example, polyethylene, is used, the effects of the present invention are provided.

Figure 10A:
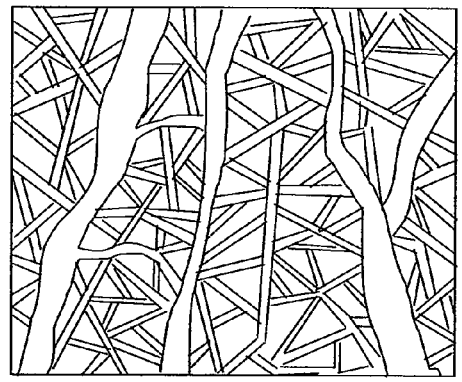
FIG. 10A is an enlarged schematic plan view of a separator.

FIG. 10A schematically shows the surface of the separator 103a formed of polyethylene. The separator 103a is in a meshed state which is provided by crosslinking a fiber polyolefin resin. Owing to this, the separator 103a has liquid and gas permeability. The separator 103a is a microporous film formed of a resin with no electron conductivity, and having a large ion permeability and prescribed mechanical strength and electric insulating property.

It is preferable that the pores of the separator 103a have a diameter in such a range that does not allow the active material, the binder and the conductor detached from the positive electrode compound 101b or the negative electrode compound 102b to pass the pores, for example, 0.01 to 1 μm. The thickness of the separator 103a is generally selected from the range of 5 to 100 μm. The porosity is determined based on the electron or ion permeability, the material or the film pressure, and is preferably 30 to 80% in general. The separator 103a may be obtained by stacking microporous films having different compositions. For example, the separator 103a may be a multilayer film of polypropylene and polyethylene from the viewpoint of heat resistance and pore closability.

Figure 10B:
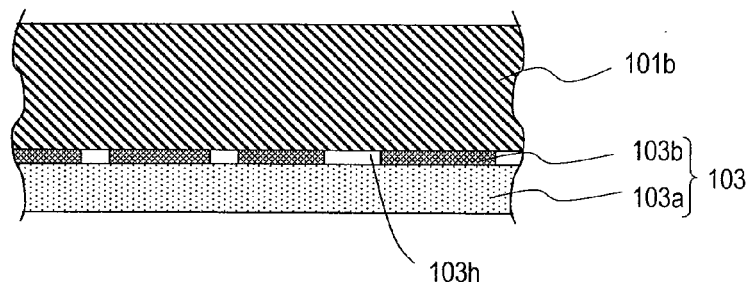
FIG. 10B is an enlarged cross-sectional view of the separator and the vicinity thereof in the electrode assembly.

FIG. 10B is an enlarged schematic view of a cross-sectional structure of the insulating layer 103b and the vicinity thereof. As shown in FIG. 10B, the insulating layer 103b has micropores 103h. The insulating layer 103b has the micropores 103h in order not to spoil the permeability of the separator 103a. The micropores 103h allow the nonaqueous electrolyte solution 115 filling the battery case 114 to fill a portion between the negative electrode 102 and the positive electrode 101 through the insulating layer-provided separator 103. Thus, the lithium ions and the electrolysis in the electrolyte solution 115 can move toward the positive electrode 101, or toward the negative electrode 102. The micropores 103h may have any size as long as the surface of the positive electrode does not contact the surface of the separator 103a. The size of the micropores 103h may occasionally rely on the shape of the surface of the separator 103a.

It is preferable that the insulating layer 103b has a thickness of 10 nm or greater and 1 μm or less. A more preferable thickness is 10 nm or greater and 50 nm or less. When the thickness of the insulating layer 103b is less than 10 nm, the insulating effect is not sufficiently provided. When the thickness of the insulating layer 103b exceeds 1 μm, the ratio of the insulating layer 103b, which does not contribute to the battery capacity, with respect to the battery case is too high, and so the battery capacity is reduced. Where the thickness of the insulating layer 103b is kept 50 nm or less, the reduction of the battery capacity can be suppressed.

It is preferable that the ratio of the part of the surface of the separator 103a covered by the insulating layer 103b with respect to the entirety of the surface of the separator 103a which is in contact with the positive electrode 101 is 50% or greater and 100% or less. When the ratio is less than 50%, the effect of suppressing the oxidation of the separator 103a is not sufficiently provided.

Like in Embodiment 1, the insulating layer 103b is provided between the positive electrode 101 and the separator 103a, and may be formed of any insulating material which can electrically insulate the separator 103a from the positive electrode compound 101b, for example, silicon oxide, silicon nitride or the like. It should be noted that such an insulating material is preferably inorganic because an organic insulating material may possibly elute into the nonaqueous electrolysis. Usable inorganic materials include, for example, metal oxides such as aluminum oxide and the like, metal nitrides such as aluminum nitride and the like, metal hydroxides such as aluminum hydroxide and the like, and metal halides such as aluminum fluoride and the like. From the viewpoint of reliability, it is more preferable to mainly use aluminum fluoride, which has a higher insulating property and a melting point of 1000° C. or higher.

According to the present invention, special attention is paid to the nonaqueous electrolyte solution 115 containing fluorine-containing ions. The insulating layer 103b is formed of aluminum fluoride, which is obtained by reacting aluminum with the fluorine component in the nonaqueous electrolyte solution 115. While the lithium ion secondary battery, which is produced using the separator 103a having an aluminum cover film formed on the surface thereof, is processed with initial charge, aluminum reacts with the fluorine component in the nonaqueous electrolyte solution 115. Thus, the insulating layer 103b of aluminum fluoride is formed on the surface of the separator 103a.

Figure 11:
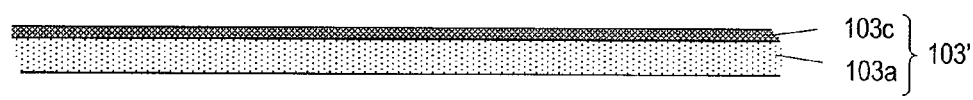
FIG. 11 is a cross-sectional view showing a state in the middle of production of an insulating layer.

Specifically, as shown in FIG. 11, a separator 103'having an aluminum cover film 103c formed on one of a pair of main surfaces of the separator 103a by a thin film formation technology is prepared. Next, the separator 103' having the aluminum cover film 103c on the surface thereof is held between the positive electrode 101 and the negative electrode 102 such that the cover film 103c faces the positive electrode 101. Thus, the electrode assembly is produced. After the electrode assembly is accommodated in the battery case, the battery case is filled with a nonaqueous electrolyte solution obtained by dissolving a fluorine-containing lithium salt such as lithium hexafluorophosphate, lithium tetrafluoroborate or the like in an organic solvent. Thus, the lithium ion secondary battery is completed.

Next, this lithium ion secondary battery is processed with initial charge. The aluminum cover film 103c reacts with the fluorine component in the electrolyte solution during the charging, and as shown in FIG. 9, the insulating layer 103b of aluminum fluoride is formed.

Instead of by the reaction with the fluorine component in the nonaqueous electrolyte solution, the aluminum cover film 103c may be fluorided by exposing the cover film 103c formed on the surface of the separator 103a to fluorine gas, by treating the cover film 103c with a solution containing hydrogen fluoride, or by reacting the cover film 103c with a fluorine-compound.

The aluminum cover film 103c may be formed by a vacuum process such as sputtering, vapor deposition or the like. Instead of the vacuum process, the aluminum cover film 103c may be formed by gas deposition, aerosol deposition or the like, by which a gas flow containing aluminum micropowder is jetted from a nozzle and caused to collide against the substrate to form a film. The aluminum cover film 103c may also be formed by any other method usable for forming an aluminum thin film. Alternatively, the insulating layer 103b formed of aluminum fluoride may be directly formed on the surface of the separator 103a using a thin film formation technology such as sputtering or the like.

What should be noted is that the method of producing a battery using the separator having an aluminum cover film and then fluoriding aluminum by the reaction with the fluorine component in the electrolyte solution is simpler and costs less than the method of producing the battery after the aluminum cover film is fluorided or the method of forming the cover film using aluminum fluoride.

The insulating layer 103b only needs to contain aluminum fluoride and may also contain any other insulating aluminum compound such as aluminum oxide, aluminum hydroxide, aluminum nitride or the like. The aluminum cover film does not need to be completely fluorided. As long as the insulating layer 103b containing aluminum fluoride is formed to a thickness of 10 nm or greater on the side of the positive electrode 101, the aluminum cover film may exist on the remaining part, namely, on the side of the separator 103a. In this case, aluminum may contain a chemical element such as silicon, iron, copper, manganese, magnesium, zinc, titanium or the like. However, in order to form the insulating layer 103b in a simple manner and at relatively low cost with a sufficient insulating property being guaranteed, it is preferable that the insulating layer 103b containing aluminum fluoride as a main component is formed to a thickness of 10 nm or greater on the surface of the separator 103a, the surface facing the positive electrode 101.

Patent Documents Nos. 1 and 2 disclose, as a method for forming a metal halide cover film on the surface of the active material particles, a method of exposing active material powder to fluorine gas to fluoride the surface thereof, a method of synthesizing the cover film using a lithium compound, a metal halide and a transition metal-containing compound as starting materials and mixing and sintering these materials, and a mechanochemical method of mixing the active material powder and a fluorine compound in an automatic mortar. In the case where a metal halide cover film is formed on the surface of the active material particles by any of these methods to form a positive electrode, there is a high possibility that a cover layer is existent inside the positive electrode; specifically, between active material particles, between the active material particles and the conductor particles, and at an interface between the active material particles and the current collector. In such a case, as described above, the electrode reaction may be inhibited.

Japanese Laid-Open Patent Publication No. 11-45740 discloses a nonaqueous electrolytic battery in which metal halide powder having a particle diameter of 0.1 to 5 μm is added to the inside of the positive electrode and the negative electrode or to interfaces between the separator and these electrodes. The metal halide powder has a relatively low melting point of 100 to 300° C., and is provided in order to absorb the heat generated at the time of internal shortcircuiting owing to the heat of melting.

The metal halide powder is not provided for the purpose of electrically insulating the separator and the positive electrode from each other. Therefore, the present invention is different from the nonaqueous electrolytic battery disclosed in this publication in terms of structure. Aluminum fluoride has a melting point of 1040° C. A substance having such a high melting point is not usable to absorb the heat generated at the time of internal shortcircuiting. Using a metal halide having a such low melting point proposed in Japanese Laid-Open Patent Publication No. 11-45740 for the present invention is not preferable from the viewpoint of reliability. Therefore, on the above-mentioned points, the technology disclosed by Japanese Laid-Open Patent Publication No. 11-45740 is totally different from the present invention.

The nonaqueous electrolyte solution 115 is formed of a nonaqueous solvent and a lithium salt soluble in the nonaqueous solvent. As the nonaqueous solvent, any known nonaqueous solvent is usable with no specific limitation. Usable nonaqueous solvents include, for example, cyclic carbonates such as ethylene carbonate (EC), propylene carbonate (PC), butylene carbonate (BC) and the like; and non-proton organic solvents such as dimethyl carbonate (DMC), diethyl carbonate (DEC), ethylmethyl carbonate (EMC) and the like. These materials are used independently or as a mixture of two or more. It is especially preferable to use a nonaqueous solvent containing at least ethylene carbonate or propylene carbonate having a high dielectric constant in order to provide a splendid high-load discharge characteristic.

As the lithium salt soluble in the nonaqueous solvent, any known lithium salt is usable with no specific limitation. Usable lithium salts include, for example, $LiClO_4$, $LiBF_4$, $LiPF_6$, $LiAlCl_4$, $LiSbF_6$, LiSCN, LiCl, $LiCF_3SO_3$, $LiCF_3CO_2$, $Li(CF_3SO_2)_2$, $LiAsF_6$, $LiN(CF_3SO_2)_2$, $LiB_{10}Cl_{10}$, lower aliphatic lithium carboxylate, LiCl, LiBr, LiI, chloroborane lithium, lithium tetraphenylborate, and the like. One of, or a combination of two or more, of these materials may be dissolved in the nonaqueous solvent to be used.

Especially in the case where $LiBF_4$ (lithium tetrafluoroborate) or $LiPF_4$ (lithium hexafluorophosphate) among the above-described lithium salts is used, merely by forming an aluminum cover film on the surface of the separator 103a, the aluminum cover film can be fluorided during the initial charge to form the insulating layer 103b. Therefore, use of $LiBF_4$ or $LiPF_6$ allows the insulating layer 103b to be formed by a simple process.

In addition, the nonaqueous electrolysis used in the present invention may be used in the form of a gel, which is obtained by incorporating a known polymer or a precursor thereof to the above-described structure.

As shown in FIG. 8A, the battery case 114 accommodates the electrode assembly 113. The battery case 114 is filled with the nonaqueous electrolyte solution 115, which permeates to the inside of the electrode assembly 113. The battery case 114 may be a bag of laminated film which is obtained by laminating a resin film on both surfaces of a metal battery can or metal foil of Al, Fe or the like. It is preferable to use a laminated film battery case in order to realize a lightweight and thin secondary battery.

The battery case 114 may have any shape with no specific limitation, and may be, for example, coin-shaped, sheet-shaped, polygonal, sufficiently large to be used for electric automobiles or the like. The nonaqueous electrolyte secondary battery according to the present invention is usable for mobile information terminals, mobile electronic devices, home-use compact power storage devices, automatic two-wheel vehicles, electric automobiles, hybrid electric automobiles and the like.

Figure 12:
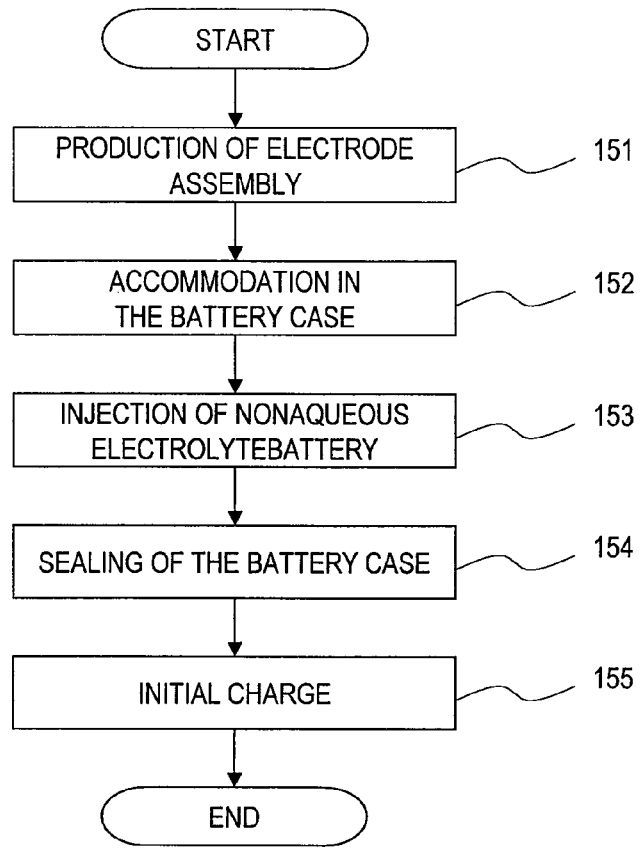
FIG. 12 is a flowchart showing a method for producing the nonaqueous electrolyte secondary battery in Embodiment 2 according to the present invention.

Such a nonaqueous electrolyte secondary battery may be produced by, for example, the following method. FIG. 12 is a flowchart showing an example of a method for producing the nonaqueous electrolyte secondary battery.

First, the electrode assembly 113 is produced (step 151). As described above, the electrode assembly 113 is produced by stacking the separator 103' having the aluminum cover film 103c on the surface thereof as shown in FIG. 11 between the positive electrode 101 and the negative electrode 102.

Next, the electrode assembly 113 is accommodated in the battery case 114 (step 152), and the nonaqueous electrolyte solution 115 is injected into the battery case 114 (step 153). The injection of the nonaqueous electrolyte solution 115 is usually performed at room temperature and atmospheric pressure, but may be performed at a higher temperature and a higher pressure in the case where the nonaqueous electrolyte solution 115 has a high viscosity. It is preferable that after the nonaqueous electrolyte solution is injected, the impregnation of the inside of the electrode assembly with the nonaqueous electrolyte solution 115 is promoted by putting the inside of the battery case into a reduced pressure state for deaeration and then returning the pressure of the inside of the battery case to atmospheric pressure.

After the nonaqueous electrolyte solution is injected, an opening of the battery case is tightly closed to seal the battery case (step 154). In the case where the battery case 114 is formed of a laminated film, it is preferable to use thermal fusion to close the opening. Before tightly closing the opening of the battery case, the inside of the battery case may be put into a reduced pressure state.

Next, the battery is processed with initial charge (step 155). During the initial charge, the aluminum cover film 103c reacts with the fluorine component in the electrolyte solution and thus the insulating layer 103b of aluminum fluoride is formed on the surface of the separator 103a as shown in FIG. 9. Thus, the nonaqueous electrolyte secondary battery is completed.

In the nonaqueous electrolyte secondary battery in this embodiment, the insulating layer is provided on the surface of the separator, the surface being in contact with the positive electrode, and the separator is electrically insulated from the positive electrode. Therefore, even though the lithium ion secondary battery is charged/discharged at a high voltage, the part of the separator facing the positive electrode is not exposed to the oxidized atmosphere, and so the separator is suppressed from being oxidized and from being decomposed by being oxidized. Accordingly, a highly reliable lithium ion secondary battery is realized, which has a splendid high-rate charge/discharge characteristic because of being chargeable/dischargeable at a high voltage, and suppresses the occurrence of micro shortcircuiting. Even the nonaqueous electrolyte secondary battery of the specifications of being charged/discharged at a high voltage can use a separator formed of a polyolefin, such as polyethylene or the like, which is low-cost but has a problem in oxidation resistance.

The insulating layer is provided only on the surface of the separator, the surface being in contact with the positive electrode. Therefore, the volume ratio of the insulating layer with respect to the lithium ion secondary battery is low, and the ratio of the substances which are not involved in the occlusion/release of lithium can be kept minimum. In addition, since the insulating layer does not cover the entire surface of the particles of the positive electrode active material, the positive electrode active material is not inactivated. For this reason, a large capacity can be realized.

However, the aluminum cover film is formed on the surface of the separator, and the aluminum cover film and the fluorine component in the nonaqueous electrolyte solution are reacted with each other. Thus, the insulating layer formed of aluminum fluoride can be formed. Therefore, the number of production steps which would be increased when the insulating layer is added to the lithium ion secondary battery, and the extra cost and time required by such an increase, can be saved.

Accordingly, a lithium ion secondary battery which suppresses the occurrence of micro shortcircuiting and thus is reliable, is highly productive, has a large capacity, and has a splendid high-rate charge/discharge characteristic is realized.

In this embodiment, the positive and negative electrodes each have a compound containing an active material provided on one surface of the respective current collector. Alternatively, a nonaqueous electrolyte secondary battery including an electrode assembly having a larger number of layers can also be carried out. In such an electrode assembly, positive and negative electrodes interposing therebetween a compound which has an active material on both surfaces thereof, and a separator carrying a cation-polymerizable polymer, are alternately stacked. Still alternatively, the present invention is preferably applicable to a nonaqueous electrolyte secondary battery including a jelly roll type electrode assembly, in which a positive electrode and a negative electrode interposing therebetween a separator carrying a cation-polymerizable polymer are rolled.

In Embodiments 1 and 2, the insulating layer containing aluminum fluoride is attached to the positive electrode or the separator. The reason for this is that an aluminum thin film for forming the insulating layer is difficult to be treated in the form of a single body. However, an aluminum thin film, which has a thickness of around submicrons, may possibly be treated in the form of a single body with no need to be formed on the positive electrode or the separator. In this case, the insulating layer may be formed as follows. During the production of a nonaqueous electrolyte secondary battery, an aluminum thin film in the form of a single body is held between the positive electrode and the separator, and the aluminum thin film is fluorided during the initial charge. In this case, the insulating layer is not attached to the positive electrode or the separator. However, the presence of the insulating layer between the positive electrode and the separator provides the effects of the present invention as described in Embodiments 1 and 2.

As described below, in order to confirm the effects of the present invention, the nonaqueous electrolyte secondary batteries in Embodiments 1 and 2 were produced under various conditions and the characteristics thereof were evaluated. First, with reference to FIGS. 1A, 1B and 2, the production of the nonaqueous electrolyte secondary batteries in Embodiment 1 and the evaluation results of the characteristics thereof will be described.

Production and Evaluation of the Nonaqueous Electrolyte Secondary Batteries in Embodiment 1

1. Production of the Batteries

Example 1

A battery containing $Li_{1.03}Ni_{0.33}CO_{0.33}Mn_{0.33}O_2$ as the positive electrode active material, having an aluminum cover film formed on a surface of the positive electrode and having a polyethylene porous sheet as the separator was produced.

(1) Production of the Positive Electrode

As the positive electrode active material, $Li_{1.03}Ni_{0.33}CO_{0.33}Mn_{0.33}O_2$ (average particle diameter: 10 µm; specific surface area by the BET method: 0.38 m$^2$/g) was used. To 100 parts by weight of this active material, 3 parts by weight of acetylene black as the conductor, 4 parts by weight of poly(vinylidene fluoride) as the binder, and an appropriate amount of N-methyl-2-pyrrolidone were added. These substances were stirred and mixed together to obtain the positive electrode compound 1b in a slurry form. The poly(vinylidene fluoride) was used after being dissolved in N-methyl-2-pyrrolidone.

Next, as shown in FIG. 4, the positive electrode compound 1b in the slurry form was applied to one surface of the current collector 1a formed of a 20 µm-thick aluminum foil, and the obtained film was dried and rolled by a roller.

$Li_{1.03}Ni_{0.33}Co_{0.33}Mn_{0.33}O_2$ which was used as the positive electrode active material, was prepared as follows. First, sulfates of Co and Mn were added at a prescribed ratio to an aqueous solution of nickel sulfate to prepare a saturated aqueous solution. While this saturated aqueous solution was stirred at a low rate, an alkaline solution having sodium hydroxide dissolved therein was dropped to the saturated aqueous solution. Thus, a precipitate of ternary hydroxide, $Ni_{0.33}Co_{0.33}Mn_{0.33}(OH)_2$, was obtained. This precipitate obtained by coprecipitation was filtrated, rinsed with water and dried at 80° C. in the air. The average particle diameter of the obtained hydroxide was about 10 µm.

Next, the obtained hydroxide was heat-treated at 380° C. for 10 hours in the atmospheric air to obtain ternary oxide, $Ni_{0.33}Co_{0.33}Mn_{0.33}O$. The obtained oxide was confirmed to have a single phase by powder x-ray diffraction.

To the obtained oxide, powder of lithium hydroxide—hydrate was mixed such that the ratio of the molarity sum of Ni, Co and Mn and the molarity of Li would be 1.00:1.03. The resultant substance was heat-treated at 1000° C. for 10 hours in the dry air. Thus, the $Li_{1.03}Ni_{0.33}Co_{0.33}Mn_{0.33}O_2$ as the target substance was obtained. The obtained transition metal-containing composite oxide was confirmed to have a single-phase hexagonal crystal layer structure in which Co and Mn were dissolved in $LiNiO_2$ to form a solid solution. After being pulverized and classified, the obtained transition metal-containing composite oxide was observed with a scanning electron microscope to confirm that a great number of primary particles having a size of about 0.1 to 1.0 µm were aggregated to form a secondary particle of a generally spherical shape to an ellipsoidal shape.

Next, the aluminum cover film 1e was formed by sputtering on the surface of the positive electrode compound 1b produced as described above. Specifically, the film was formed by an RF sputtering apparatus under the conditions that an aluminum plate was used as a target, the distance between the substrate and the target was 4 cm, the inner pressure of the chamber was 1.2 Pa, and the output was 0.2 kW. The film formation rate was 3.125 nm per minute. The film formation time period was adjusted to produce films having thicknesses of 5 nm, 10 nm, 50 nm and 100 nm. The thickness of each aluminum cover film formed was measured by observing a cross-section thereof treated by CP (cross-section polisher) with an electron microscope. A positive electrode having the aluminum cover film having a thickness of 5 nm will be referred to as "positive electrode A", a positive electrode having the aluminum cover film having a thickness of 10 nm will be referred to as "positive electrode B", a positive electrode having the aluminum cover film having a thickness of 50 nm will be referred to as "positive electrode C", and a positive electrode having the aluminum cover film having a thickness of 100 nm will be referred to as "positive electrode D".

Figure 6:
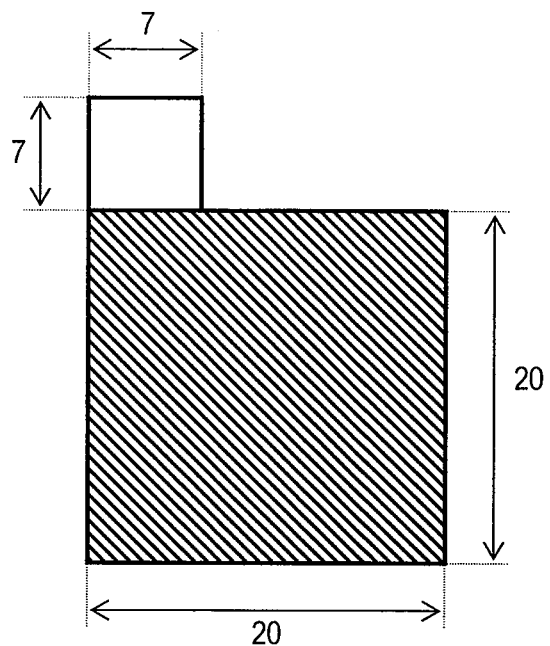
FIG. 6 shows a size of a positive electrode in an example.

The obtained positive electrodes A through D were each punched into the size shown in FIG. 6, and the positive electrode compound 1b was peeled off from a tab, to which the lead was to be attached. Thus, the positive electrode 1 was obtained. The positive electrode current collector 1a, on which the positive electrode compound 1b with the aluminum thin film was formed, had a square shape, each side of which was 20 mm long.

(2) Production of the Negative Electrode

Figure 7:
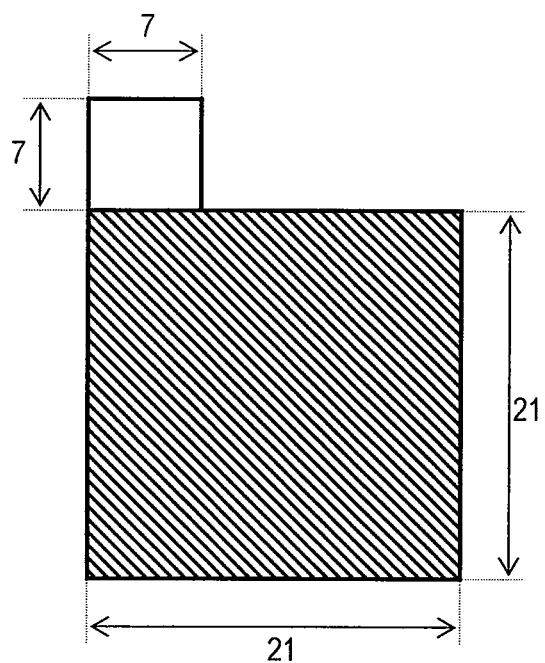
FIG. 7 shows a size of a negative electrode in an example.

A stainless steel (SUS304) mesh plate 2a was punched into the size shown in FIG. 7, and a 150 μm-thick lithium metal plate 2b cut into a square, each side of which was 21 mm long, was pressure-contacted onto the mesh plate 2a. Thus, the negative electrode 2 was obtained.

(3) Assembly

The obtained positive electrode 1, the obtained negative electrode 2, and the separator 3 formed of a polyethylene microporous sheet were assembled together to form a thin nonaqueous electrolyte secondary battery as shown in FIGS. 1a and 1B (thickness: 0.5 mm; width: 40 mm; height: 50 mm; design capacity when charged to 4.3V: 14 mAh). First, as shown in FIGS. 1a and 1B, the positive electrode 1 and the negative electrode 2 were stacked with the separator 3 being interposed therebetween to form the electrode assembly 13. To the positive electrode 1 and the negative electrode 2, the positive electrode lead 11 formed of aluminum and the negative electrode lead 12 formed of nickel were respectively welded. The electrode assembly 13 was accommodated in the battery case 14 which had a thickness of 0.12 mm, was opened in three directions and was formed of an aluminum laminated film; and was fixed on an inner surface of the aluminum laminated film with a PP tape. The two openings including the opening through which the positive electrode lead 11 and the negative electrode lead 12 were drawn out were closed by thermal fusion to shape the battery case 14 of the aluminum laminated film like a bag. A prescribed amount of nonaqueous electrolyte solution was injected into the battery case 14 through the remaining opening. The inside of the battery case 14 was treated with pressure reduction and deaeration, and then the opening was closed by thermal fusion in the reduced pressure state to seal the battery case. The nonaqueous electrolyte solution was obtained by dissolving $LiPF_6$ in a mixed solvent of ethylene carbonate and ethylmethyl carbonate contained at a volume ratio of 30:70, such that the concentration of $LiPF_6$ would be 1.0 mol/L.

A battery produced using positive electrode A will be referred to as "battery A1", a battery produced using positive electrode B will be referred to as "battery B1", a battery produced using positive electrode C will be referred to as "battery C1", and a battery produced using positive electrode D will be referred to as "battery D1".

2. First-Time Charge, Initial Discharge

Batteries A1, B1, C1 and D1 produced as described above were processed with initial charge, initial discharge, and aging.

The initial charge and the initial discharge were performed as follows. Each battery was charged under the environment of 25° C. for 4 hours at a constant current value of 0.7 mA, and then discharged down to 3.0V at a constant current value of 0.7 mA. This changed the aluminum cover film 1e formed on the surface of the positive electrode 1 to the insulating layer 1c.

The aging was performed as follows. Batteries A1, B1, C1 and D1, already processed with the initial charge and the initial discharge, were charged up to 4.0V under the environment of 25° C. at a constant current value of 0.7 mA, and then stored under the environment of 45° C. for 24 hours.

Comparative Example 1

A battery was produced in the same manner as in Example 1 except that a positive electrode with no aluminum cover film 1e formed on a surface thereof was used. This battery will be referred to as "battery E1".

Comparative Example 2

Positive electrode F was produced in the same manner as in Example 1 except that positive electrode active material particles having a surface covered with aluminum fluoride beforehand was used and that the process of forming the aluminum cover film on the surface of the positive electrode by forming and rolling the positive electrode compound 1b on the current collector 1a was not performed. A battery produced using positive electrode F will be referred to as "battery F1".

The surface of the positive electrode active material particles was covered with aluminum fluoride by mechanofusion, which is a technique using a compressive attrition mill. 180 g of $Li_{1.03}Ni_{0.33}Co_{0.33}Mn_{0.33}O_2$ powder used in Example 1 and 20 g of aluminum fluoride powder produced by Kanto Chemical Co., Inc. were put into the compressive attrition mill and processed for 20 minutes at a rotation rate of 1800 rpm. Thus, a positive electrode active material, the particles of which had a surface covered with aluminum fluoride, was obtained.

It was confirmed that at least 80% of the entire surface area of the post-processing active material particles was covered with aluminum fluoride, using a scanning electron microscope (SEM), an electron probe micro-analyzer (EPMA) or the like.

Example 2

Batteries were produced with the same structure as in Example 1 except that an electrolyte solution obtained by dissolving lithium tetrafluoroborate ($LiBF_4$), instead of lithium hexafluorophosphate ($LiPF_6$), in a nonaqueous solvent was used.

A battery produced using positive electrode A will be referred to as "battery A2", a battery produced using positive electrode B will be referred to as "battery B2", a battery produced using positive electrode C will be referred to as "battery C2", and a battery produced using positive electrode D will be referred to as "battery D2".

Comparative Example 3

A battery was produced in the same manner as in Example 2 except that a positive electrode with no aluminum cover film formed on a surface thereof was used. This battery will be referred to as "battery E2".

Example 3

A battery was produced in the same manner as in Example 1 except that a positive electrode having an aluminum fluoride cover film formed on a surface thereof beforehand was used. The positive electrode will be referred to as "positive electrode G", and the battery will be referred to as "battery G1".

The aluminum fluoride cover film was produced by vacuum vapor deposition. A pellet of aluminum fluoride was put into a resistive heating boat formed of tantalum, and this was used as a vapor deposition source. The film was formed under the conditions that the distance between the substrate and the target was 20 cm and the inner pressure of the chamber was $2 \times 10^{-3}$ Pa. The film formation rate was 40 nm per minute. The film formation time period was adjusted to produce a film having a thickness of 10 nm. The thickness of the obtained aluminum fluoride cover film was confirmed by observing a cross-section thereof treated by CP with an electron microscope.

3. Evaluation

Batteries A1, B1, C1, D1, E1, F1, A2, B2, C2, D2, E2 and G1 produced above were evaluated as follows.

(1) Evaluation of the State of the Surface of the Positive Electrode

Among batteries A1 through F1 and batteries A2 through E2, which were produced in a plurality of pieces for each type, one battery of each type was disassembled to take out the positive electrode. The surface of the positive electrode was analyzed by x-ray photoelectron spectroscopy (XPS). The electrodes taken out from batteries A1 through F1 and batteries A2 through E2 will be respectively referred to as "electrodes A1 through F1" and "electrodes A2 through E2".

With the surface of each of electrodes A1 through D1, F1, and A2 through D2, a peak by an Al—F bond was observed. Thus, an insulating layer of aluminum fluoride was confirmed to be formed. The thickness of the insulating layer was 12 nm in each of electrodes A1 and A2 and was 25 nm in each of electrodes B2 and B2, and the entirety of the formed aluminum cover film had been changed to the insulating layer of aluminum fluoride.

In the measurement made on electrodes C1, C2, D1 and D2 in the thickness direction, a peak by an Al—F bond was observed in an area from the surface to a depth of 50 nm. It is considered that an insulating layer of aluminum fluoride was formed to a thickness of 50 nm. With electrodes E1 and E2 obtained in Comparative Example 3, no Al—F peak was observed, and thus it was confirmed that no layer of aluminum fluoride was formed.

(2) Evaluation of Battery Characteristic: High-Rate Discharge Characteristic

Among batteries A1 through G1 and batteries A2 through E2, which were produced in a plurality of pieces for each type, one battery of each type was charged up to 4.3V under the environment of 25° C. at a constant current value of 2.8 mA, and further charged at a constant voltage of 4.3V until the current value was attenuated to 0.7 mA. At this point, the charging was terminated. Then, each battery was discharged down to 3.0V under the environment of 25° C. at a constant current value of 1.4 mA. The discharge capacity obtained at this point was set as the initial discharge capacity. Each battery in the discharged state was charged up to 4.3V under the environment of 25° C. at a constant current value of 2.8 mA, and further charged at a constant voltage of 4.3V until the current value was attenuated to 0.7 mA. Then, each battery was discharged down to 3.0V under the environment of 25° C. at a constant current value of 2.8 mA. The discharge capacity obtained at this point was set as the high-rate discharge capacity. For each battery to be evaluated, a value obtained by dividing the high-rate discharge capacity by the initial discharge capacity is defined as the high-rate discharge characteristic and shown in Table 1 with percentage (high-rate discharge characteristic=high-rate discharge capacity/initial discharge capacity).

TABLE 1

| | Battery | High-rate discharge characteristic (%) | Reliability evaluation | | | |
|---|---|---|---|---|---|---|
| | | | 4.2 V | 4.3 V | 4.4 V | 4.5 V |
| Example 1 | A1 | 89 | ○ | ○ | ○ | ○ |
| | B1 | 89 | ○ | ○ | ○ | ○ |
| | C1 | 88 | ○ | ○ | ○ | ○ |
| | D1 | 86 | ○ | ○ | ○ | ○ |
| Comparative Example 1 | E1 | 89 | ○ | X | X | X |
| Comparative Example 2 | F1 | 64 | ○ | ○ | ○ | ○ |
| Example 2 | A2 | 81 | ○ | ○ | ○ | ○ |
| | B2 | 81 | ○ | ○ | ○ | ○ |
| | C2 | 80 | ○ | ○ | ○ | ○ |
| | D2 | 79 | ○ | ○ | ○ | ○ |
| Comparative Example 3 | E2 | 81 | ○ | X | X | X |
| Example 3 | G1 | 89 | ○ | ○ | ○ | ○ |

As shown in Table 1, the high-rate discharge characteristic value of battery F1 in Comparative Example 2, in which the positive electrode active material covered with aluminum fluoride beforehand was used, is lower than those of any other battery. This is considered to have occurred for the following reason: since the surface of the positive electrode active material particles is covered with aluminum fluoride, the activity of the surface of the positive electrode active material is decreased, which reduces the occlusion/release reactivity of lithium ions caused by charge/discharge and thus increases the polarization at the time of high-rate discharge.

The high-rate discharge characteristic values of batteries A1 through G1 in Example 1, Comparative Example 1 and Example 3 are different by about 8% from those of batteries A2 through E2 in Example 2 and Comparative Example 3. This is considered to reflect the difference in the electrolysis. Whichever electrolysis is used, the high-rate discharge characteristic value is slightly lowered when the aluminum cover film formed is thicker.

From a comparison between Example 1 and Comparative Example 1 and a comparison between Example 2 and Comparative Example 3, it is understood that provision of an insulating layer of aluminum fluoride does not lower the high-rate discharge characteristic almost at all.

(3) Evaluation of Battery Characteristic: 4.2 V Reliability Evaluation

Among batteries A1 through G1 and batteries A2 through E2, which were produced in a plurality of pieces for each type, one battery of each type was charged up to 4.2V under the environment of 60° C. at a constant current value of 2.8 mA in the state where the electrode in the battery was uniformly pressurized at 0.4 MPa, and further charged at a constant voltage of 4.2V for 10 days. The current attenuation behavior during the battery was charged at a constant voltage was evaluated. It was determined that in a battery in which the current value was once decreased but was increased in the middle of the charging, micro shortcircuiting occurred. Such a battery is represented with "X" in Table 1. It was determined that in a battery in which the current value was decreased to be generally flat, micro shortcircuiting did not occur. Such a battery is represented with "○" in Table 1.

As shown in Table 1, with the 4.2 V reliability evaluation, none of batteries A1 through G1 and batteries A2 through E2 which were evaluated exhibited the current recovery behavior, which indicates that micro shortcircuiting phenomenon did not occur.

(4) Evaluation of Battery Characteristic: 4.3 V Reliability Evaluation

The evaluation was performed in the same manner as in the 4.2 V reliability evaluation except that the batteries were charged up to 4.3 V. The results are shown in Table 1.

As shown in Table 1, battery E1 in Comparative Example 1 and battery E2 in Comparative Example 3 exhibited the current recovery behavior, which indicates that micro shortcircuiting phenomenon occurred. By contrast, none of the batteries in the examples caused the micro shortcircuiting phenomenon.

It is considered that the above results were caused by the following. In battery E1 in Comparative Example 1 and battery E2 in Comparative Example 3, the positive electrode does not have a protective layer of aluminum fluoride on the surface thereof. Therefore, the separator formed of polyethylene is oxidized as a result of contacting the positive electrode in a highly oxidized state due to the electron conductivity thereof.

By contrast, in the batteries in the examples, the insulating layer formed of aluminum fluoride exists between the positive electrode active material in a highly oxidized state and the separator formed of polyethylene. It is considered that for this reason, the surface of the separator is not exposed to a high potential state and as a result, the separator is not oxidized and so the micro shortcircuiting phenomenon does not occur.

(5) Evaluation of Battery Characteristic: 4.4 V Reliability Evaluation

The evaluation was performed in the same manner as in the 4.2 V reliability evaluation except that the batteries were charged up to 4.4 V. The results are shown in Table 1.

As shown in Table 1, battery E1 in Comparative Example 1 and battery E2 in Comparative Example 3 exhibited the current recovery behavior, which indicates that micro shortcircuiting phenomenon occurred. By contrast, none of the batteries in the examples caused the micro shortcircuiting phenomenon.

(6) Evaluation of Battery Characteristic: 4.5 V Reliability Evaluation

The evaluation was performed in the same manner as in the 4.2 V reliability evaluation except that the batteries were charged up to 4.5 V. The results are shown in Table 1.

As shown in Table 1, battery E1 in Comparative Example 1 and battery E2 in Comparative Example 3 exhibited the current recovery behavior, which indicates that micro shortcircuiting phenomenon occurred. By contrast, none of the batteries in the examples caused the micro shortcircuiting phenomenon.

From the above results, it was found that micro shortcircuiting is unlikely to occur even without an insulating layer as long as the charge/discharge cycle is repeated at about 4.2 V, which is a charge voltage of a lithium ion secondary battery generally used today. It was found, however, that when the charge/discharge cycle is repeated at a voltage higher than 4.2 V, micro shortcircuiting is likely to occur without an insulating layer and that micro shortcircuiting can be effectively suppressed by providing an insulating layer. It was also found that micro shortcircuiting can be effectively suppressed even where the thickness of the insulating layer is several nanometers.

Therefore, it is understood that the lithium ion secondary battery in Embodiment 1 has a splendid high-rate discharge characteristic while having high reliability because of not causing the micro shortcircuiting phenomenon even when being charged at a high voltage of 4.5 V.

(Production and Evaluation of the Nonaqueous Electrolyte Secondary Batteries in Embodiment 2)

With reference to FIGS. 8h, 8B and 9, the production of the nonaqueous electrolyte secondary batteries in Embodiment 2 and the evaluation results of the characteristics thereof will be described.

1. Production of the Batteries

Example 4

An aluminum cover film was formed on a surface of a polyethylene porous sheet, and the cover film was fluorided during the production process of the battery to form an insulating layer, to form a separator. This will be described.

(1) Production of the Positive Electrode

As the positive electrode active material, $Li_{1.03}Ni_{0.33}Co_{0.33}Mn_{0.33}O_2$ (average particle diameter: 10 μm; specific surface area by the BET method: 0.38 m$^2$/g) was used. To 100 parts by weight of this active material, 3 parts by weight of acetylene black as the conductor, 4 parts by weight of poly(vinylidene fluoride) as the binder, and an appropriate amount of N-methyl-2-pyrrolidone were added. These substances were stirred and mixed together to obtain the positive electrode compound 101b in a slurry form. The poly(vinylidene fluoride) was used after being dissolved in N-methyl-2-pyrrolidone.

Next, the positive electrode compound 101b in the slurry form was applied to one surface of the current collector 101a formed of a 20 μm-thick aluminum foil, and the obtained film was dried and rolled by a roller. $Li_{1.03}Ni_{0.33}Co_{0.33}Mn_{0.33}O_2$, which was used as the positive electrode active material, was prepared as follows. First, sulfates of Co and Mn were added at a prescribed ratio to an aqueous solution of nickel sulfate to prepare a saturated aqueous solution. While this saturated aqueous solution was stirred at a low rate, an alkaline solution having sodium hydroxide dissolved therein was dropped to the saturated aqueous solution. Thus, a precipitate of ternary hydroxide, $Ni_{0.33}Co_{0.33}Mn_{0.33}(OH)_2$, was obtained. This precipitate obtained by coprecipitation was filtrated, rinsed with water and dried at 80° C. in the air. The average particle diameter of the obtained hydroxide was about 10 μm.

Next, the obtained hydroxide was heat-treated at 380° C. for 10 hours in the atmospheric air to obtain ternary oxide, $Ni_{0.33}Co_{0.33}Mn_{0.33}O$. The obtained oxide was confirmed to have a single phase by powder x-ray diffraction.

To the obtained oxide, powder of lithium hydroxide-hydrate was mixed such that the ratio of the molarity sum of Ni, Co and Mn and the molarity of Li would be 1.00:1.03. The resultant substance was heat-treated at 1000° C. for 10 hours in the dry air. Thus, the $Li_{1.03}Ni_{0.33}Co_{0.33}Mn_{0.33}O_2$ as the target substance was obtained. The obtained transition metal-containing composite oxide was confirmed to have a single-phase hexagonal crystal layer structure in which Co and Mn were dissolved in $LiNiO_2$ to form a solid solution. After being pulverized and classified, the obtained transition metal-containing composite oxide was observed with a scanning electron microscope to confirm that a great number of primary particles having a size of about 0.1 to 1.0 μm were aggregated to form a secondary particle of a generally spherical shape to an ellipsoidal shape.

Figure 13:
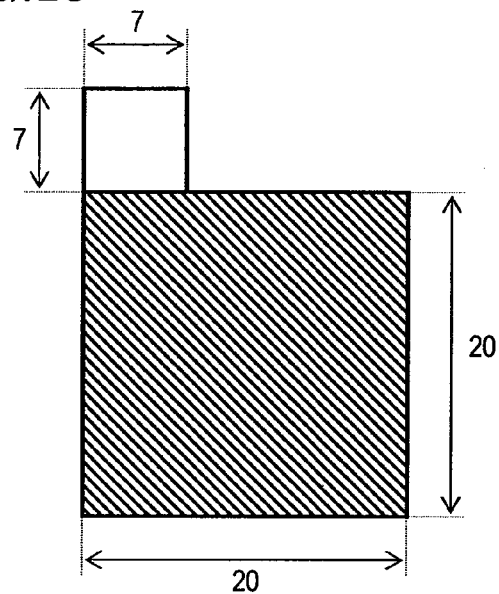
FIG. 13 shows a size of a positive electrode in an example.

The obtained positive electrode was punched into the size shown in FIG. 13, and the positive electrode compound 101b was peeled off from a tab, to which the lead was to be attached. Thus, the positive electrode 101 was obtained.

(2) Production of the Negative Electrode

Figure 14:
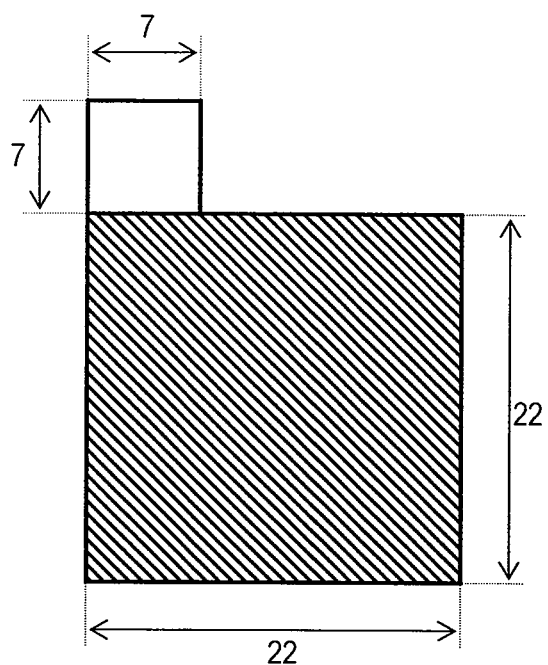
FIG. 14 shows a size of a negative electrode in an example.

A stainless steel (SUS304) mesh plate 102a was punched into the size shown in FIG. 14, and a 150 μm-thick lithium metal plate 102b cut into a square, each side of which was 22 mm long, was pressure-contacted onto the mesh plate 102a. Thus, the negative electrode 102 was obtained.

(3) Production of the Separator

As shown in FIG. 10B, the aluminum cover film 103c was formed on a surface of the separator 103a formed of a commercially available polyethylene porous sheet (produced by Asahi Kasei Chemicals Corporation; product No. N9420C; thickness: 20 μm) by sputtering. The film was specifically formed by an RF sputtering apparatus under the conditions that an aluminum plate was used as a target, the distance between the substrate and the target was 4 cm, the inner pressure of the chamber was 1.2 Pa, and the output was 0.2 kW. The film formation rate was 3.125 mm per minute. The film formation time period was adjusted to produce films having thicknesses of 5 nm, 10 nm, 50 nm and 100 nm. The thickness of each aluminum cover film 103c formed was measured by observing a cross-section thereof treated by CP (cross-section polisher) with an electron microscope. A separator having the aluminum cover film having a thickness of 5 nm will be referred to as "separator A", a separator having the aluminum cover film having a thickness of 10 nm will be referred to as "separator B", a separator having the aluminum cover film having a thickness of 50 nm will be referred to as "separator C", and a separator having the aluminum cover film having a thickness of 100 nm will be referred to as "separator D".

For forming a battery, each of the obtained separators A through D was cut into a square, each side of which was 30 mm long.

(4) Assembly

The positive electrode 101, the negative electrode 102 and the separator 103' obtained were assembled to form a thin nonaqueous electrolyte secondary battery as shown in FIGS. 8A and 8B (thickness: 0.5 mm; width: 40 mm; height: 50 mm; design capacity when charged to 4.3V: 14 mAh). First, as shown in FIG. 9, the positive electrode 101 and the negative electrode 102 were stacked with the separator 103' being interposed therebetween to form the electrode assembly 113. To the positive electrode 101 and the negative electrode 102, the positive electrode lead 111 formed of aluminum and the negative electrode lead 112 formed of nickel were respectively welded. The electrode assembly 113 was accommodated in the battery case 114 which had a thickness of 0.12 mm, was opened in three directions and was formed of an aluminum laminated film; and was fixed on an inner surface of the aluminum laminated film with a PP tape. The two openings including the opening through which the positive electrode lead 111 and the negative electrode lead 112 were drawn out were closed by thermal fusion to shape the battery case 114 of the aluminum laminated film like a bag. A prescribed amount of nonaqueous electrolyte solution was injected into the battery case 114 through the remaining opening. The inside of the battery case 114 was treated with pressure reduction and deaeration, and then the opening was closed by thermal fusion in the reduced pressure state to seal the battery case. The nonaqueous electrolyte solution was obtained by dissolving $LiPF_6$ in a mixed solvent of ethylene carbonate and ethylmethyl carbonate contained at a volume ratio of 30:70, such that the concentration of $LiPF_6$ would be 1.0 mol/L.

A battery produced using separator A will be referred to as "battery A1'", a battery produced using separator B will be referred to as "battery B1'", a battery produced using separator C will be referred to as "battery C1'", and a battery produced using separator D will be referred to as "battery D1'".

2. First-Time Charge, Initial Discharge

Batteries A1', B1', C1' and D1' produced as described above were processed with initial charge, initial discharge, and aging.

The initial charge and the initial discharge were performed as follows. Each battery was charged under the environment of 25° C. for 4 hours at a constant current value of 0.7 mA, and then discharged down to 3.0V at a constant current value of 0.7 mA. This changed the aluminum cover film 103c formed on the surface of the separator 103a to the insulating layer 103b.

The aging was performed as follows. Batteries A1', B1', C1' and D1', already processed with the initial charge and the initial discharge, were charged up to 4.0V under the environment of 25° C. at a constant current of 0.7 mA, and then stored under the environment of 45° C. for 24 hours.

Comparative Example 4

A battery was produced in the same manner as in Example 4 except that a separator with no aluminum cover film 103c formed on a surface thereof was used. This battery will be referred to as "battery E1'".

Comparative Example 5

Positive electrode F was produced in the same manner as in Example 4 except that positive electrode active material particles having a surface covered with aluminum fluoride beforehand was used and that the process of forming the aluminum cover film on the surface of the positive electrode by forming and rolling the positive electrode compound 101b on the current collector 101a was not performed. A battery produced using positive electrode F will be referred to as "battery F1'".

The surface of the positive electrode active material particles was covered with aluminum fluoride by mechanofusion, which is a technique using a compressive attrition mill. 180 g of $Li_{1.03}Ni_{0.33}Co_{0.33}Mn_{0.33}O_2$ powder used in Example 4 and 20 g of aluminum fluoride powder produced by Kanto Chemical Co., Inc. were put into the compressive attrition mill and processed for 20 minutes at a rotation rate of 1800 rpm. Thus, a positive electrode active material, the particles of which had a surface covered with aluminum fluoride, was obtained.

It was confirmed that at least 80% of the entire surface area of the post-processing active material particles was covered with aluminum fluoride, using a scanning electron microscope (SEM), an electron probe micro-analyzer (EPMA) or the like.

Example 5

Batteries were produced with the same structure as in Example 4 except that an electrolyte solution obtained by dissolving lithium tetrafluoroborate ($LiBF_4$), instead of lithium hexafluorophosphate ($LiPF_6$), in a nonaqueous solvent was used.

A battery produced using separator A will be referred to as "battery A2'", a battery produced using separator B will be referred to as "battery B2'", a battery produced using separator C will be referred to as "battery C2'", and a battery produced using separator D will be referred to as "battery D2'".

Comparative Example 6

A battery was produced in the same manner as in Example 5 except that a separator with no aluminum cover film formed on the surface thereof was used. This battery will be referred to as "battery E2'".

Example 6

A battery was produced in the same manner as in Example 4 except that a separator having an aluminum fluoride cover film formed on a surface thereof beforehand was used. The separator will be referred to as "separator G", and the battery will be referred to as "battery G1'".

The aluminum fluoride cover film was produced by vacuum vapor deposition. A pellet of aluminum fluoride was put into a resistive heating boat formed of tantalum, and this was used as a vapor deposition source. The film was formed under the conditions that the distance between the substrate and the target was 20 cm and the inner pressure of the chamber was $2 \times 10^{-3}$ Pa. The film formation rate was 40 nm per minute. The film formation time period was adjusted to produce a film having a thickness of 10 nm. The thickness of the obtained aluminum fluoride cover film was confirmed by observing a cross-section thereof treated by CP with an electron microscope.

3. Evaluation

Batteries A1', B1', C1', D1', E1', F1', A2', B2', C2', D2', E2' and G1' produced above were evaluated as follows.

(1) Evaluation of the State of the Surface of the Separator

Among batteries A1' through F1' and batteries A2' through E2', which were produced in a plurality of pieces for each type, one battery of each type was disassembled to take out the separator. The surface of the separator was analyzed by x-ray photoelectron spectroscopy (XPS). The separators taken out from batteries A1' through F1' and batteries A2' through E2' will be respectively referred to as "separators A1' through F1'" and "separators A2' through E2'".

With the surface of each of separators A1' through D1', F1', and A2' through D2', a peak by an Al—F bond was observed. Thus, an insulating layer of aluminum fluoride was confirmed to be formed. The thickness of the insulating layer was 12 nm in each of separators A1' and A2' and was 25 nm in each of separators B1' and B2', and the entirety of the formed aluminum cover film had been changed to the insulating layer of aluminum fluoride.

In the measurement made on separators C1', C2', D1' and D2' in the thickness direction, a peak by an Al—F bond was observed in an area from the surface to a depth of 50 nm. It is considered that an insulating layer of aluminum fluoride was formed to a thickness of 50 nm. With separators E1' and E2' obtained in Comparative Example 6, no Al—F peak was observed, and thus it was confirmed that no layer of aluminum fluoride was formed.

(2) Evaluation of Battery Characteristic: High-Rate Discharge Characteristic

Among batteries A1' through G1' and batteries A2' through E2', which were produced in a plurality of pieces for each type, one battery of each type was charged up to 4.3V under the environment of 25° C. at a constant current value of 2.8 mA, and further charged at a constant voltage of 4.3V until the current value was attenuated to 0.7 mA. At this point, the charging was terminated. Then, each battery was discharged down to 3.0V under the environment of 25° C. at a constant current value of 1.4 mA. The discharge capacity obtained at this point was set as the initial discharge capacity. Each battery in the discharged state was charged up to 4.3V under the environment of 25° C. at a constant current value of 2.8 mA, and further charged at a constant voltage of 4.3V until the current value was attenuated to 0.7 mA. Then, each battery was discharged down to 3.0V under the environment of 25° C. at a constant current value of 2.8 mA. The discharge capacity obtained at this point was set as the high-rate discharge capacity. For each battery to be evaluated, a value obtained by dividing the high-rate discharge capacity by the initial discharge capacity is defined as the high-rate discharge characteristic and shown in Table 2 with percentage (high-rate discharge characteristic=high-rate discharge capacity/initial discharge capacity).

TABLE 2

| | Battery | High-rate discharge characteristic (%) | Reliability evaluation | | | |
|---|---|---|---|---|---|---|
| | | | 4.2 V | 4.3 V | 4.4 V | 4.5 V |
| Example 4 | A1' | 89 | ◯ | ◯ | ◯ | ◯ |
| | B1' | 89 | ◯ | ◯ | ◯ | ◯ |
| | C1' | 88 | ◯ | ◯ | ◯ | ◯ |
| | D1' | 86 | ◯ | ◯ | ◯ | ◯ |
| Comparative Example 4 | E1' | 89 | ◯ | X | X | X |
| Comparative Example 5 | F1' | 64 | ◯ | ◯ | ◯ | ◯ |
| Example 5 | A2' | 81 | ◯ | ◯ | ◯ | ◯ |
| | B2' | 81 | ◯ | ◯ | ◯ | ◯ |
| | C2' | 80 | ◯ | ◯ | ◯ | ◯ |
| | D2' | 79 | ◯ | ◯ | ◯ | ◯ |
| Comparative Example 6 | E2' | 81 | ◯ | X | X | X |
| Example 6 | G1' | 89 | ◯ | ◯ | ◯ | ◯ |

As shown in Table 2, the high-rate discharge characteristic value of battery F1' in Comparative Example 5, in which the positive electrode active material covered with aluminum fluoride beforehand was used, is lower than those of any other battery. This is considered to have occurred for the following reason: since the surface of the positive electrode active material particles is covered with aluminum fluoride, the activity of the surface of the positive electrode active material is decreased, which reduces the occlusion/release reactivity of lithium ions caused by charge/discharge and thus increases the polarization at the time of high-rate discharge.

The high-rate discharge characteristic values of batteries A1' through G1' in Example 4, Comparative Example 4 and Example 6 are different by about 8% from those of batteries A2' through E2' in Example 5 and Comparative Example 6. This is considered to reflect the difference in the electrolysis. Whichever electrolysis is used, the high-rate discharge characteristic value is slightly lowered when the aluminum cover film formed is thicker.

From a comparison between Example 4 and Comparative Example 4 and a comparison between Example 5 and Comparative Example 6, it is understood that provision of an insulating layer of aluminum fluoride does not lower the high-rate discharge characteristic almost at all.

(3) Evaluation of Battery Characteristic: 4.2 V Reliability Evaluation

Among batteries A1' through G1' and batteries A2' through E2', which were produced in a plurality of pieces for each type, one battery of each type was charged up to 4.2V under the environment of 60° C. at a constant current value of 2.8 mA in the state where the electrode in the battery was uniformly pressurized at 0.4 MPa, and further charged at a constant voltage of 4.2V for 10 days. The current attenuation behavior during the battery was charged at a constant voltage was evaluated. It was determined that in a battery in which the current value was once decreased but was increased in the middle of the charging, micro shortcircuiting occurred. Such a battery is represented with "X" in Table 2. It was determined that in a battery in which the current value was decreased to be generally flat, micro shortcircuiting did not occur. Such a battery is represented with "○" in Table 2.

As shown in Table 2, with the 4.2 V reliability evaluation, none of batteries A1' through G1' and batteries A2' through E2' which were evaluated exhibited the current recovery behavior, which indicates that micro shortcircuiting phenomenon did not occur.

(4) Evaluation of Battery Characteristic: 4.3 V Reliability Evaluation

The evaluation was performed in the same manner as in the 4.2 V reliability evaluation except that the batteries were charged up to 4.3 V. The results are shown in Table 2.

As shown in Table 2, battery E1' in Comparative Example 4 and battery E2' in Comparative Example 6 exhibited the current recovery behavior, which indicates that micro shortcircuiting phenomenon occurred. By contrast, none of the batteries in the examples caused the micro shortcircuiting phenomenon.

It is considered that the above results were caused by the following. In battery E1' in Comparative Example 4 and battery E2' in Comparative Example 6, the separator does not have a protective layer of aluminum fluoride on the surface thereof. Therefore, the resin layer of polyethylene of the separator is oxidized as a result of contacting the positive electrode active material in a highly oxidized state due to the electron conductivity thereof.

By contrast, in the batteries in the examples, the insulating layer formed of aluminum fluoride exists between the positive electrode active material in a highly oxidized state and the resin layer of polyethylene. It is considered that for this reason, the surface of the resin layer is not exposed to a high potential state and as a result, the resin layer of the separator is not oxidized and so the micro shortcircuiting phenomenon does not occur.

(5) Evaluation of Battery Characteristic: 4.4 V Reliability Evaluation

The evaluation was performed in the same manner as in the 4.2 V reliability evaluation except that the batteries were charged up to 4.4 V. The results are shown in Table 2.

As shown in Table 2, battery E1' in Comparative Example 4 and battery E2' in Comparative Example 6 exhibited the current recovery behavior, which indicates that micro shortcircuiting phenomenon occurred. By contrast, none of the batteries in the examples caused the micro shortcircuiting phenomenon.

(6) Evaluation of Battery Characteristic: 4.5 V Reliability Evaluation

The evaluation was performed in the same manner as in the 4.2 V reliability evaluation except that the batteries were charged up to 4.5 V. The results are shown in Table 2.

As shown in Table 2, battery E1' in Comparative Example 4 and battery E2' in Comparative Example 6 exhibited the current recovery behavior, which indicates that micro shortcircuiting phenomenon occurred. By contrast, none of the batteries in the examples showed any micro shortcircuiting phenomenon.

From the above results, it was found that micro shortcircuiting is unlikely to occur even without an insulating layer as long as the charge/discharge cycle is repeated at about 4.2 V, which is a charge voltage of a lithium ion secondary battery generally used today. It was found, however, that when the charge/discharge cycle is repeated at a voltage higher than 4.2 V, micro shortcircuiting is likely to occur without an insulating layer and that micro shortcircuiting can be effectively suppressed by providing an insulating layer. It was also found that micro shortcircuiting can be effectively suppressed even where the thickness of the insulating layer is several nanometers.

Therefore, it is understood that the lithium ion secondary battery in Embodiment 2 has a splendid high-rate discharge characteristic while having high reliability because of not causing the micro shortcircuiting phenomenon even when being charged at a high voltage of 4.5 V.

INDUSTRIAL APPLICABILITY

A nonaqueous electrolyte secondary battery according to the present invention has a splendid high-rate discharge characteristic and high reliability at a high energy density, and is preferably usable as a power supply of mobile devices such as mobile phones, notebook computers and the like.

The invention claimed is:

1. A nonaqueous electrolyte secondary battery, comprising:
   a positive electrode and a negative electrode which are capable of reversibly occluding and releasing lithium, the positive electrode including a positive electrode current collector and positive electrode compound layer that has a positive electrode active material and an electron conductive material and is supported by the positive electrode current collector;
   a resin layer provided between the positive electrode and the negative electrode;
   a battery case accommodating the positive electrode, the negative electrode and the resin layer;
   a nonaqueous electrolyte solution filling the battery case; and
   an insulating layer interposed, at least partially, between the resin layer and one of a pair of main surfaces of the positive electrode compound layer, on which the positive electrode current collector is not provided, the resin layer and the positive electrode compound layer are electrically isolated from each other, the insulating layer containing aluminum fluoride.

2. The nonaqueous electrolyte secondary battery of claim 1, wherein the insulating layer is provided on at least a part of a surface of the positive electrode, the surface facing the resin layer.

3. The nonaqueous electrolyte secondary battery of claim 1, wherein:
   the resin layer is a separator having no electron conductivity; and
   the insulating layer is provided on at least a part of a surface of the separator, the surface facing the positive electrode.

4. The nonaqueous electrolyte secondary battery of claim 1, wherein the insulating layer is microporous.

5. The nonaqueous electrolyte secondary battery of claim 4, wherein the insulating layer has a thickness of 10 nm or greater and 1 μm or less.

6. The nonaqueous electrolyte secondary battery of claim 5, wherein the nonaqueous electrolyte solution contains at least one type of fluorine-containing lithium salt.

7. The nonaqueous electrolyte secondary battery of claim 6, wherein the fluorine-containing lithium salt is one selected from the group consisting of lithium hexafluorophosphate and lithium tetrafluoroborate.

8. The nonaqueous electrolyte secondary battery of claim 2, wherein the resin layer is a separator having no electron conductivity.

9. The nonaqueous electrolyte secondary battery of claim 3, wherein the separator is a microporous sheet having a polyolefin resin as a main component.

10. The nonaqueous electrolyte secondary battery of claim 9, wherein the polyolefin resin contains polyethylene.

11. A method for producing a nonaqueous electrolyte secondary battery, the method comprising the steps of:
  preparing a positive electrode capable of reversibly occluding and releasing lithium, a negative electrode capable of reversibly occluding and releasing lithium, and a resin layer, the positive electrode including a positive electrode current collector, a positive electrode compound layer that has a positive electrode active material and an electron conductive material and is supported by the positive electrode current collector, and an aluminum-containing cover film, the aluminum-containing cover film being formed on, at least partially, one of a pair of main surfaces of the positive electrode compound layer, on which the positive electrode current collector is not provided;
  impregnating an electrode assembly, in which the positive electrode and the negative electrode are located to interpose the resin layer therebetween such that the cover film of the positive electrode faces the resin layer, with a nonaqueous electrolyte solution containing an organic solvent and at least one type of fluorine-containing lithium salt; and
  charging the electrode assembly impregnated with the nonaqueous electrolyte solution to react the fluorine-containing lithium salt in the nonaqueous electrolyte solution with the cover film, thereby forming an aluminum fluoride-containing insulating layer on at least a part of the surface of the positive electrode compound layer, the surface facing the resin layer.

* * * * *